United States Patent
Gotman et al.

(10) Patent No.: US 9,118,512 B2
(45) Date of Patent: Aug. 25, 2015

(54) COMBINED IMBALANCE COMPENSATION AND EQUALIZATION OF A SIGNAL

(71) Applicant: QUALCOMM Incorporated, San Diego, CA (US)

(72) Inventors: Maxim Gotman, Kfar-Saba (IL); Tal Oved, Modi'in (IL); Josef Waldman, Bahan (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/194,346

(22) Filed: Feb. 28, 2014

(65) Prior Publication Data
US 2014/0254644 A1  Sep. 11, 2014

Related U.S. Application Data

(60) Provisional application No. 61/773,578, filed on Mar. 6, 2013.

(51) Int. Cl.
| H04B 1/38 | (2006.01) |
| H04L 5/16 | (2006.01) |
| H04L 27/01 | (2006.01) |

(52) U.S. Cl.
CPC .................... H04L 27/01 (2013.01)

(58) Field of Classification Search
CPC . H04M 11/06; H04M 11/062; H04L 25/4927
USPC ........................................... 375/222
See application file for complete search history.

(56) References Cited

U.S. PATENT DOCUMENTS

| 2008/0165874 | A1* | 7/2008 | Steele et al. ............. 375/261 |
| 2012/0128377 | A1* | 5/2012 | Hatae et al. ............. 398/208 |
| 2012/0288026 | A1 | 11/2012 | Wang |
| 2013/0117342 | A1 | 5/2013 | Azadet et al. |
| 2013/0214860 | A1 | 8/2013 | Brown et al. |

OTHER PUBLICATIONS

Ding, L. et al., "Compensation of Frequency-Dependent Gain/Phase Imbalance in Predistortion Linearization Systems", IEEE Transactions on Circuits and Systems—I: Regular Papers, vol. 55, No. 1, Feb. 2008, pp. 390-397.
Tarighat A. et al., "Compensation Schemes and Performance Analysis of IQ Imbalances in OFDM Receivers", IEEE Transactions on Signal Processing, vol. 53, Aug. 2005, pp. 3257-3268.

* cited by examiner

Primary Examiner — Tanmay Shah
(74) Attorney, Agent, or Firm — Holland & Hart LLP

(57) ABSTRACT

Methods, systems, and apparatuses are described for compensating for impairments of a wireless device. In accordance with a disclosed method, a set of equalizer taps for an analog pipeline of the wireless device is determined. A first set of complex filter taps and a second set of complex filter taps are also determined, by modifying the set of equalizer taps according to an estimated imbalance of the analog pipeline of the wireless device. A signal associated with the analog pipeline is processed with a complex filter according to the first set of complex filter taps and the second set of complex filter taps. The processing provides a combined imbalance compensation and equalization of the signal. The complex filter may include a first complex half-filter associated with the first set of complex filter taps and a second complex half-filter associated with the second set of complex filter taps.

18 Claims, 13 Drawing Sheets

COMBINED IMBALANCE COMPENSATION AND EQUALIZATION OF A SIGNAL

CROSS REFERENCES

The present application for patent claims priority to U.S. Provisional Patent Application No. 61/773,578 by Gotman et al., entitled "Combined Imbalance Compensation and Equalization of a Signal," filed Mar. 6, 2013, assigned to the assignee hereof, and expressly incorporated by reference herein.

BACKGROUND

The present description relates generally to wireless communication, and more specifically to methods, systems, and apparatus to compensate for impairments of a wireless device. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links (i.e., over wireless channels). Each base station has a coverage range, which may be referred to as the coverage area of the cell. During system operation of the base station, various components may introduce impairments into a wireless device (e.g., due to thermal and temporal variations). Common impairments may be associated with analog image rejection filters that can be asymmetric across a spectrum of interest, and in-phase/quadrature (I/Q) modulators. The former may cause unwanted droops in the passband of a transmitted signal, and the latter may inject gain and phase variations between the I/Q components of the transmitted signal. These impairments may deteriorate the quality of wireless signals transmitted between the base station and a mobile device, thereby reducing the effective data rate between the base station and the mobile device.

SUMMARY

The present description generally relates to one or more improved methods, systems, and/or apparatuses for compensating for impairments of a wireless device. In particular, disclosed herein are methods, systems, and apparatus that combine the functionality of I/Q imbalance compensation and signal equalization (i.e., spectrum equalization) into a single complex filter.

In accordance with a first set of illustrative embodiments, a disclosed method of compensating for impairments of a wireless device includes determining a set of equalizer taps for an analog pipeline of the wireless device. A first set of complex filter taps and a second set of complex filter taps may also be determined, by modifying the set of equalizer taps according to an estimated imbalance of the analog pipeline of a wireless device. A signal associated with the analog pipeline may be processed with a complex filter according to the first set of complex filter taps and the second set of complex filter taps.

The processing may provide a combined imbalance compensation and equalization of the signal, wherein the complex filter comprises a first complex half-filter associated with the first set of complex filter taps and a second complex half-filter associated with the second set of complex filter taps. Each complex half-filter processes both an in-phase component of the signal and a quadrature component of the signal.

In certain examples, processing the signal may include: passing an in-phase component of the signal through a multi-stage in-phase delay line of the complex filter; and passing a quadrature component of the signal through a multi-stage quadrature delay line of the complex filter. Each stage of the in-phase delay line and the quadrature delay line comprises a real output and an imaginary output. The real outputs of the stages of the in-phase delay line may be summed with the imaginary outputs of the stages of the quadrature delay line to obtain an in-phase output of the complex filter, and the imaginary outputs of the stages of the in-phase delay line may be summed with the real outputs of the stages of the quadrature delay line to obtain a quadrature output of the complex filter.

In certain examples, processing the signal may include obtaining the real output of each stage of the in-phase delay line by multiplying the signal at that stage of the in-phase delay line by a real filter tap associated with that stage from the first set of complex filter taps. The processing may further include obtaining the imaginary output of each stage of the in-phase delay line of the complex filter by multiplying the signal at that stage by an imaginary filter tap associated with that stage from the second set of complex filter taps.

In certain examples, processing the signal may include obtaining the real output of each stage of the quadrature delay line by multiplying the signal at that stage of the quadrature delay line by a real filter tap associated with that stage from the second set of complex filter taps. The processing may further include obtaining the imaginary output of each stage of the quadrature delay line by multiplying the signal at that stage of the quadrature delay line by an imaginary filter tap associated with that stage from the first set of complex filter taps.

In certain examples, a gain compensation coefficient ($\alpha$) and a phase compensation coefficient ($\beta$) for the analog pipeline may be determined. At least one or both of the first set of complex filter taps and the second set of complex filter taps may be based on the set of equalizer taps, the gain compensation coefficient, and the phase compensation coefficient.

In certain examples, a measurement of the analog pipeline may be received from a receiver, and at least one or both of the gain compensation coefficient ($\alpha$) and the phase compensation coefficient ($\beta$) may be determined based on the received measurement.

In certain examples, the first set of complex filter taps may be defined by:

$$w_r(n) = (1+\alpha)h_r(n), \text{ and}$$

$$w_i(n) = h_i(n) - \beta h_r(n),$$

where $w_r$ is a real component of the first set of complex filter taps, $w_i$ is an imaginary component of the first set of complex filter taps, n is a delay line stage of the complex filter taps, $\alpha$ is the gain compensation coefficient, $\beta$ is the phase compensation coefficient, $h_r$ is a real component of the set of equalizer taps, and $h_i$ is an imaginary component of the set of equalizer taps.

In certain examples, the second set of complex filter taps may be defined by:

$$v_r(n) = h_r(n) + \beta h_i(n), \text{ and}$$

$$v_i(n) = (1+\alpha)h_i(n),$$

where $v_r$ is a real component of the second set of complex filter taps, $v_i$ is an imaginary component of the second set of complex filter taps, n is a delay line stage of the complex filter, $\alpha$ is the gain compensation coefficient, $\beta$ is the phase compensation coefficient, $h_r$ is a real component of the set of equalizer taps, and $h_i$ is an imaginary component of the set of equalizer taps.

In certain examples, processing the signal may include determining a skew between the in-phase and quadrature components of the signal on the analog pipeline, and adjusting a center tap position for at least one of the delay lines based on the determined skew.

According to a second set of illustrative embodiments, an example of a modem configured to compensate for impairments of a wireless device may include an analog pipeline, an estimation module and a complex filter. The estimation module may be configured to determine a set of equalizer taps for the analog pipeline, and to determine a first set of complex filter taps and a second set of complex filter taps by modifying the set of equalizer taps according to an estimated imbalance of the analog pipeline. The complex filter may be configured to process a signal associated with the wireless channel according to the first set of complex filter taps and the second set of complex filter taps, the processing including a combined imbalance compensation and equalization of the signal. The complex filter may comprise a first complex half-filter associated with the first set of complex filter taps and a second complex half-filter associated with the second set of complex filter taps, and each complex half-filter processes both an in-phase component of the signal and a quadrature component of the signal.

In certain examples, the complex filter may include a multi-stage in-phase delay line configured to pass an in-phase component of the signal to be transmitted; and a multi-stage quadrature delay line configured to pass a quadrature component of the signal to be transmitted. Each stage of the in-phase delay line and the quadrature delay line may include a real output and an imaginary output.

In certain examples, the complex filter may include a first summer configured to sum the real outputs of the stages of the in-phase delay line with the imaginary outputs of the stages of the quadrature delay line to obtain an in-phase output of the complex filter. The complex filter may further include a second summer configured to sum the imaginary outputs of the stages of the in-phase delay line with the real outputs of the stages of the quadrature delay line to obtain a quadrature output of the complex filter.

In certain examples, the complex filter may include a first multiplier configured to output the real output of each stage of the in-phase delay line by multiplying the signal at that stage of the in-phase delay line by a real filter tap associated with that stage from the first set of complex filter taps. The complex filter may further include a second multiplier configured to output the imaginary output of each stage of the in-phase delay line of the complex filter by multiplying the signal at that stage by an imaginary filter tap associated with that stage from the second set of complex filter taps.

In certain examples, the complex filter may include a first multiplier configured to output the real output of each stage of the quadrature delay line by multiplying the signal at that stage of the quadrature delay line by a real filter tap associated with that stage from the second set of complex filter taps. The complex filter may further include a second multiplier configured to output the imaginary output of each stage of the quadrature delay line by multiplying the signal at that stage of the quadrature delay line by an imaginary filter tap associated with that stage from the first set of complex filter taps In certain examples, at least one or both of the first set of complex filter taps and the second set of complex filter taps may be based on the set of equalizer taps, a gain compensation coefficient ($\alpha$) for the analog pipeline, and a phase compensation coefficient ($\beta$) for the analog pipeline.

In certain examples, the first set of complex filter taps may be defined by:

$$w_r(n)=(1+\alpha)h_r(n), \text{ and}$$

$$w_i(n)=h_i(n)-\beta h_r(n),$$

where $w_r$ is a real component of the first set of complex filter taps, $w_i$ is an imaginary component of the first set of complex filter taps, n is a delay line stage of the complex filter, $\alpha$ is the gain compensation coefficient, $\beta$ is the phase compensation coefficient, $h_r$ is a real component of the set of equalizer taps, and $h_i$ is an imaginary component of the set of equalizer taps.

In certain examples, the second set of complex filter taps may be defined by:

$$v_r(n)=h_r(n)+\beta h_i(n), \text{ and}$$

$$v_i(n)=(1+\alpha)h_i(n),$$

where $v_r$ is a real component of the second set of complex filter taps, $v_i$ is an imaginary component of the second set of complex filter taps, n is a delay line stage of the complex filter, $\alpha$ is the gain compensation coefficient, $\beta$ is the phase compensation coefficient, $h_r$ is a real component of the set of equalizer taps, and $h_i$ is an imaginary component of the set of equalizer taps.

In certain examples, the estimation module may be further configured to determine a skew between the in-phase and quadrature components of the signal on the analog pipeline and adjust a center tap position for at least one of the delay lines based on the determined skew.

According to a third set of illustrative embodiments, a non-transitory computer-readable medium may store instructions executable by a processor to determine a set of equalizer taps for an analog pipeline of a wireless device; determine a first set of complex filter taps and a second set of complex filter taps by modifying the set of equalizer taps according to an estimated imbalance of the analog pipeline; and process a signal associated with the analog pipeline with a complex filter according to the first set of complex filter taps and the second set of complex filter taps. The processing may include a combined imbalance compensation and equalization of the signal, wherein the complex filter comprises a first complex half-filter associated with the first set of complex filter taps and a second complex half-filter associated with the second set of complex filter taps, and each complex half-filter processes both an in-phase component of the signal and a quadrature component of the signal.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
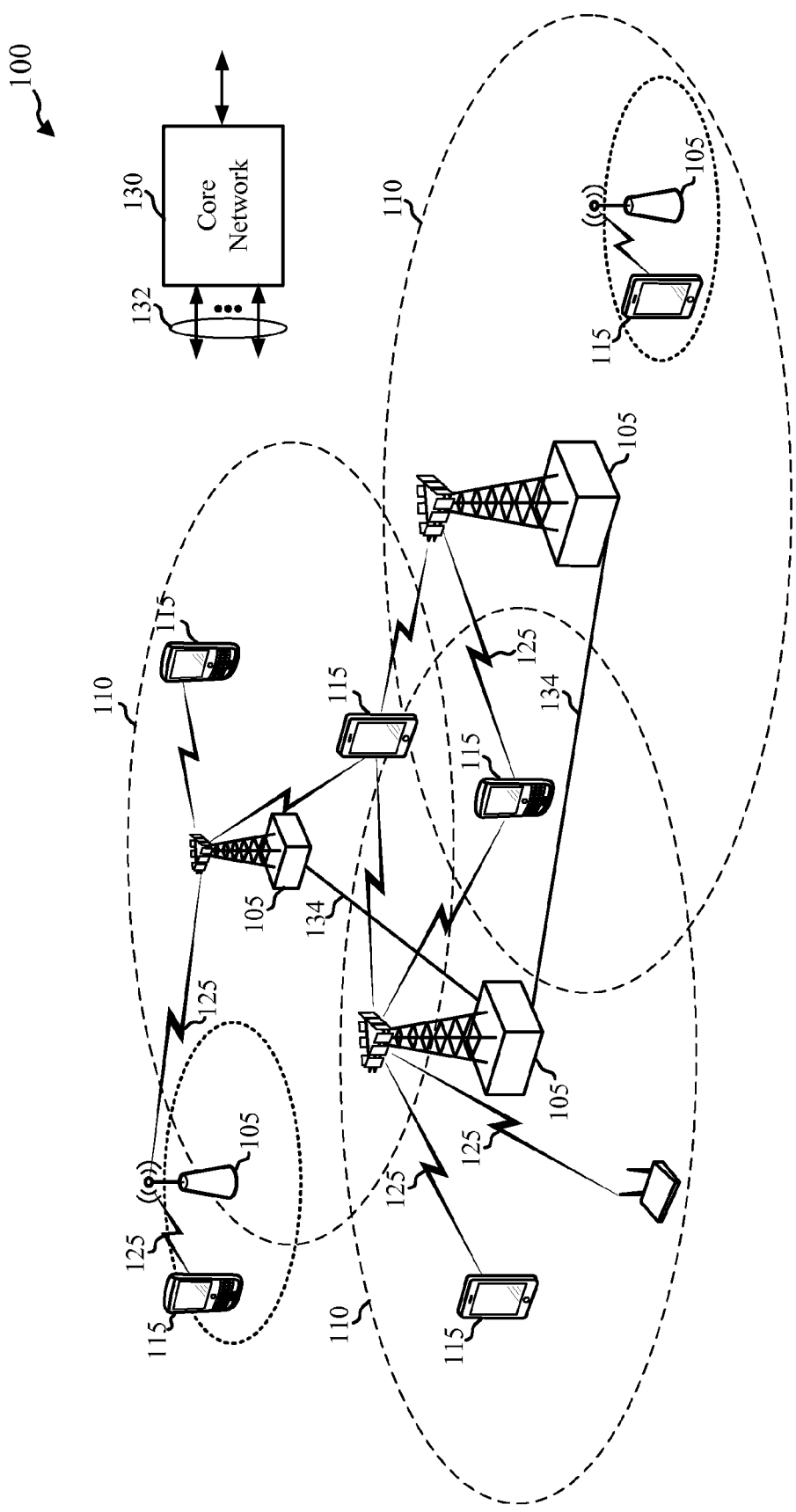
FIG. 1 shows a perspective view of a wireless communication system.

In wireless devices, a transmit or receive path of a wireless device may be compensated for impairments introduced by the analog and radio frequency (RF) components of the wireless device. For example, some modems of wireless devices include logic blocks that compensate for various impairments introduced to the transmitted signal by analog and RF modules at the transmitter or receiver. Such compensation may include pre-compensation at a transmitting device of a signal to be transmitted and/or post-compensation at a receiving device of the received signal.

Common impairments may be associated with analog image rejection filters that can be asymmetric across a spectrum of interest, and in-phase/quadrature (I/Q) modulators. The former can cause unwanted droops in the passband of the transmitted signal. The latter can inject gain and phase variations between the I/Q components of the transmitted signal.

The impairments may become more acute in modulators using digital predistortion (DPD) circuitry to linearize power amplifiers (PAs). Typically, DPD algorithms operate on a spectrum bandwidth of at least twice the bandwidth of the wireless channel, thus injecting still more impairments across this wider band. To enable efficient DPD operation, it may be desirable for the transmit path between the DPD circuitry and PA to be as 'transparent' to the predistorted signal as possible (i.e., there should be no injected signal impairments).

One conventional method of compensating for impairments introduced by the analog and RF components, also referred to as the analog pipeline, of the transmitter or receiver may be to include a separate I/Q imbalance (or mismatch) compensation circuit and a complex filter equalizer in series in the digital front end of the transmitter or a digital signal processing unit of the receiver. The I/Q imbalance compensation circuit may address gain and phase imbalances between the in-phase and quadrature components of the transmitted signal introduced by the analog pipeline, and the complex filter equalizer may correct gain and phase variations across the passband of interest. However, this two module approach may result in an inability to compensate for possible relative delay (i.e., skew) between the I and Q components, and implementation of the two separate modules may entail a more complex very large scale integrated (VLSI) circuit design and verification process. Disclosed herein are methods, systems, and apparatus that combine the functionality of I/Q imbalance compensation and signal equalization (i.e., spectrum equalization) into a single complex filter.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communication system 100. The wireless communication system 100 includes base stations (or cells) 105, mobile devices 115, and a core network 130. The base stations 105 may communicate with the mobile devices 115 under the control of a base station controller, which may be part of the core network 130 or the base stations 105 in various embodiments. Base stations 105 may communicate control information and/or user data with the core network 130 through backhaul links 132. In some embodiments, the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters may transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the mobile devices 115 via one or more base station antennas. Each of the base station 105 sites may provide communication coverage for a respective geographic coverage area 110. In some embodiments, a base station 105 may be referred to as a base transceiver station, a radio base station, an access point, a radio transceiver, a basic service set (BSS), an extended service set (ESS), a NodeB, an evolved NodeB (eNodeB or eNB), a Home NodeB, a Home eNodeB, or some other suitable terminology. The geographic coverage area 110 for a base station may be divided into sectors making up only a portion of the coverage area. The wireless communication system 100 may include base stations 105 of different types (e.g., macro, micro, and/or pico base stations). There may be overlapping coverage areas for different technologies.

In some embodiments, the wireless communication system 100 may be an LTE/LTE-A network. In LTE/LTE-A networks, the terms evolved Node B (eNB) and user equipment (UE) may be generally used to describe the base stations 105 and mobile devices 115, respectively. The wireless communication system 100 may be a Heterogeneous LTE/LTE-A network in which different types of eNBs provide coverage for various geographical regions. For example, each eNB may provide communication coverage for a macro cell, a pico cell, a femto cell, and/or other types of cell. A macro cell may generally cover a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul link 132 (e.g., S1, etc.). The base stations 105 may also communicate with one another, e.g., directly or indirectly via backhaul links 134 (e.g., X2, etc.) and/or via backhaul links 132 (e.g., through core network 130). The wireless communication system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The mobile devices 115 may be dispersed throughout the wireless communication system 100. One or more of the mobile devices 115 may also be referred to by those skilled in the art as a UE, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A mobile device 115 may include, for example, a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communication links 125 shown in the wireless communication system 100 may include uplink transmissions from a mobile device 115 to a base station 105, and/or wireless transmissions, from a base station 105 to a mobile device 115. The wireless transmissions may also be called forward link transmissions while the uplink transmissions may also be called reverse link transmissions. While the wireless communication system 100 is principally described in relation to LTE/LTE-A architectures, those skilled in the art will readily appreciate, the various concepts presented throughout this disclosure may be extended to other types of wireless networks.

As described above, a communication link 125 between a base station 105 and a mobile device 115 may be implemented over at least one wireless channel. In some embodiments, a transmitter or a receiver of the base station 105 or the mobile device may modify a signal transmitted over the wireless channel to compensate for impairments in the transmit path or the receive path, particularly impairments introduced by an analog pipeline in the transmit or receive path. These compensations may include compensations to address I/Q imbalance, as well as compensations to equalize the gain and phase variations across a transmit passband of interest. The transmitter and/or the receiver of the base station 105 and/or the mobile device 115 may include a complex digital filter with taps selected based on I/Q compensation coefficients and equalization parameters such that the complex digital filter compensates the signal for both I/Q imbalances while concurrently performing complex equalization on the signal to be transmitted.

Figure 2:
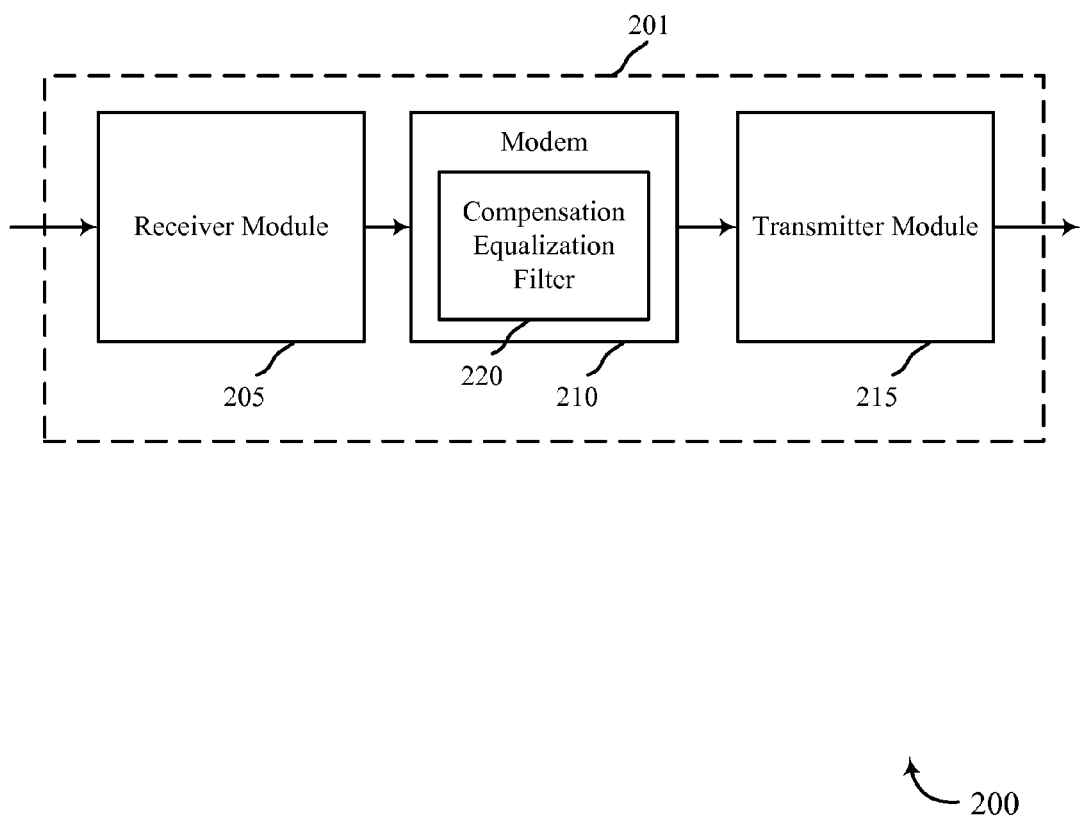
FIG. 2 is a block diagram illustrating one example of a wireless device in accordance with various embodiments.

FIG. 2 is a block diagram 200 illustrating one embodiment of a wireless device 201 in accordance with the present systems and methods. The wireless device 201 may be an example of one of the base stations 105 or mobile devices 115 illustrated in FIG. 1. The wireless device 201 may include a receiver module 205, a modem 210, and a transmitter module 215. Each of these components may be in communication with each other, directly or indirectly.

These components of the wireless device 201 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the receiver module 205 may include a cellular receiver and may receive transmissions from one or more other wireless devices. The transmitter module 215 may transmit traffic data, control signals, etc. on a downlink or uplink wireless channel to one or more other wireless devices. In one embodiment, the modem 210 may prepare the traffic data, control signals, and other transmissions that are to be transmitted on a downlink or uplink wireless channel via the transmitter module 215.

The modem 210 may in some cases include a compensation equalization filter 220. The compensation equalization filter 220 may be a type of complex filter. The modem 210 may be configured to compensate for impairments introduced by components of an analog pipeline of the transmitter module 215 and/or the receiver module 205 using the compensation equalization filter 220. For example, in some embodiments, the modem 210 may determine a set of equalizer taps for the modem. The modem 210 may also determine a first set of complex filter taps and a second set of complex filter taps. This may be done by modifying the set of equalizer taps according to an estimated imbalance (e.g., I/Q imbalance) introduced by the analog pipeline of the modem 210. The compensation equalization filter 220 may then be configured to process a signal to be transmitted on the wireless channel.

More specifically, the compensation equalization filter 220 may be configured to process a signal according to the first set of complex filter taps and the second set of complex filter taps. In contrast to past systems and methods of compensating for impairments introduced by analog pipeline, which have provided imbalance compensation apart from signal equalization, the compensation equalization filter 220 combines imbalance compensation and equalization of the signal. This may, in some embodiments, provide a more compact and simple structure for imbalance compensation and equalization of a signal.

Figure 3:
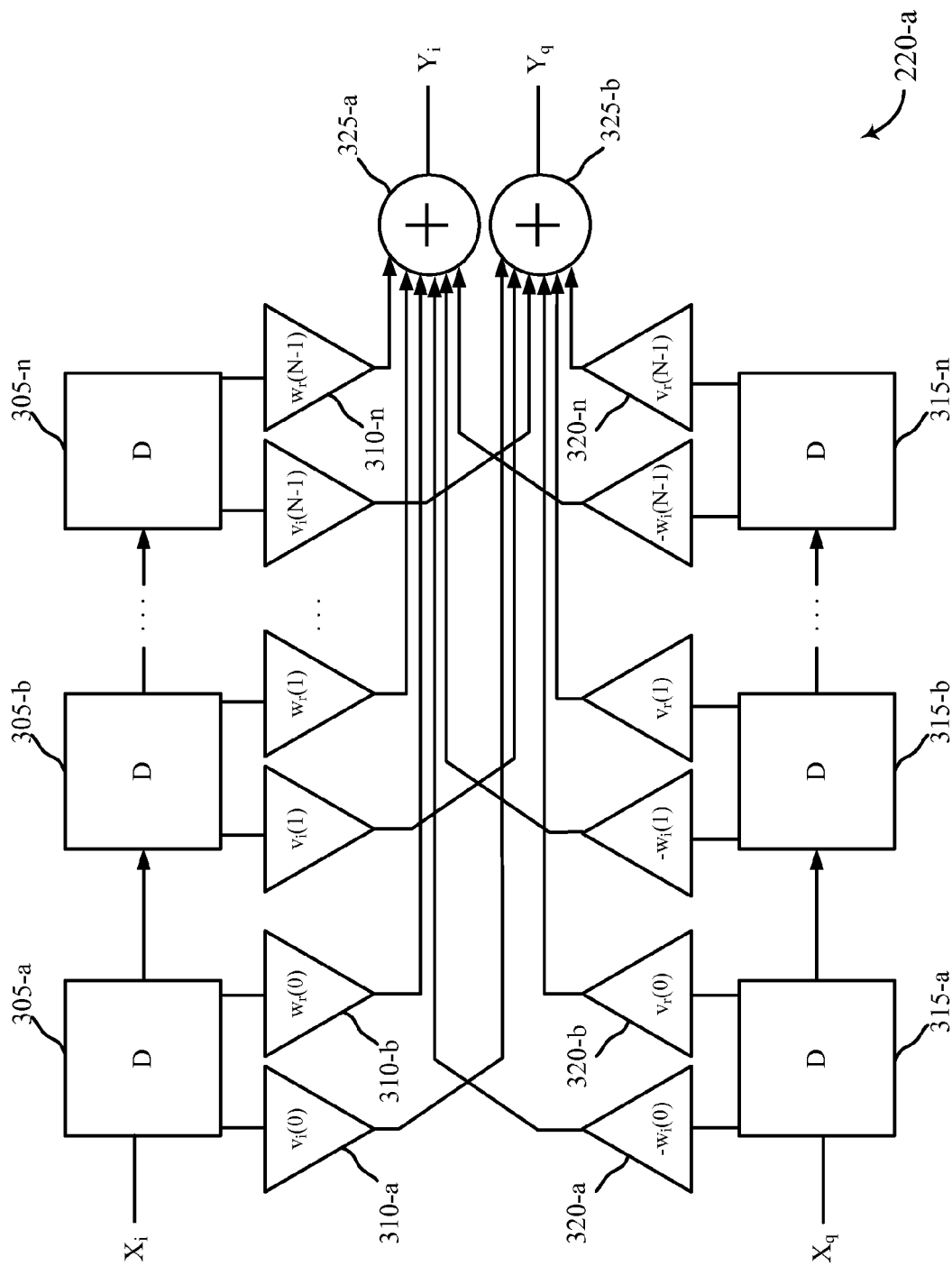
FIG. 3 is a block diagram illustrating an example of a complex, multi-stage, finite impulse response filter for performing combined impairment compensation and equalization on a signal, in accordance with various embodiments.

FIG. 3 is a block diagram illustrating one embodiment of a compensation equalization filter 220-a in accordance with various embodiments. The compensation equalization filter 220-a may be an example of the compensation equalization filter 220 illustrated in FIG. 2. The compensation equalization filter 220-a may include a plurality of storage elements 305, 315, a plurality of multiplier elements 310, 320, and a pair of summers 325. Each of these components may be in communication with each other, directly or indirectly.

These components of the compensation equalization filter 220-a may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The compensation equalization filter 220-a may be a complex filter including first and second multi-stage delay lines. Each multi-stage delay line may be implemented, for example, as a shift register made up of a series of cascaded flip flops as the storage elements 305. With each clock cycle, each storage element 305 may output its contents to the next storage element 305 in the multi-stage delay line such that samples of the signal to be transmitted or the received signal, taken at different points in time, may be stored in each storage element 305 of each multi-stage delay line.

The first multi-stage delay line may be an in-phase delay line represented by the N delay line stages including the storage elements 305-a, 305-b, through 305-n, where n is a positive integer. The second multi-stage delay line may be a quadrature delay line represented by the N delay line stages including the storage elements 315-a, 315-b, through 315-n. An in-phase component $X_i$ of a received signal or signal to be transmitted may be passed through the first multi-stage delay line, and a quadrature component $X_q$ of the signal may be passed through the second multi-stage delay line. Each stage of the in-phase or quadrature delay line may produce a real output (e.g., the output of the multiplier element 310-b or 310-d), based on the multiplication of the contents of the storage element 305 for that stage with a real tap (e.g., $w_r$ or $v_r$), and an imaginary output (e.g., the output of the multiplier element 310-a or 310-c) based on the multiplication of the contents of the storage element 305 for that stage with an imaginary tap (e.g., $w_i$ or $v_i$).

The compensation equalization filter 220-a shown in FIG. 3 is made up of a first complex half-filter associated with the first set of filter taps (w) and a second complex half-filter associated with the second set of filter taps (v). Each complex half-filter process both the in-phase component ($X_i$) and the quadrature component ($X_q$) of the signal. The output of the first complex half-filter is the output of the first summer 325-a, denoted as $Y_i$. The output of the second complex half-filter is the output of the second summer 325-b, denoted as $Y_q$. $Y_i$ reflects the in-phase component of the output of the compensation equalization filter 220-a, and $Y_q$ reflects the quadrature component of the output of the compensation equalization filter 220-a.

As discussed above, each stage of each delay line may be associated with a real tap and an imaginary tap. The taps for each stage of the delay line may be determined from a first and second set of complex filter taps. The first set of complex filter taps are represented in FIG. 3 by the variable w, and the second set of complex filter taps are represented by the variable v. As shown in FIG. 3, the first set of complex filter taps, w, may provide the real tap for each stage of the in-phase delay line and the imaginary tap for each stage of the quadrature delay line. The second set of complex filter taps, v, may provide the real tap for each stage of the quadrature delay line and the imaginary tap for each stage of the in-phase delay line. At least one or both of the first set of complex filter taps and the second set of complex filter taps may be based on a set of equalizer taps, h, a gain compensation coefficient α, and a phase compensation coefficient β. The gain and phase compensation coefficients α and β may be estimates of a gain component and a phase component, respectively, of a measured or estimated imbalance or impairment of the wireless transmit or receive path.

For example, if the wireless device is pre-compensating and equalizing a signal to be transmitted on the wireless channel, the wireless device may receive one or more measurement reports from a receiving wireless device from which the gain and phase impairments may be determined or inferred. If the wireless device is performing post-compensation of the imbalances or impairments in a received signal, the wireless device may measure the gain and phase impairment components of the signal from the received signal directly or from previously received signals on the same or a similar wireless channel. Additionally or alternatively, the compensation coefficients may be based on measurements received from other wireless devices or on known conditions associated with the wireless transmit or receive path.

In some embodiments, the first set of complex filter taps for the compensation equalization filter 220-a may be defined by the equations:

$$w_r(n) = (1+\alpha)h_r(n), \text{ and}$$

$$w_i(n) = h_i(n) - \beta h_r(n),$$

where $w_r$ is a real component of the first set of complex filter taps for the nth delay line stage, $w_i(n)$ is an imaginary component of the first set of complex filter taps for the nth delay line stage, $h_r(n)$ is a real component of a set of equalizer taps for the nth delay line stage, and $h_i$ is an imaginary component of a set of equalizer taps for the nth delay line stage.

The set of equalizer taps may be based on measured or estimated passband characteristics of the analog pipeline of the wireless device. For example, if the wireless device is pre-compensating and equalizing a signal to be transmitted on the wireless channel, the wireless device may receive one or more measurement reports from a receiving wireless device from which the passband characteristics of the wireless device may be determined or inferred. If the wireless device is performing post-compensation of the imbalances or impairments in a received signal, the wireless device may measure the passband characteristics of the wireless device from the received signal directly or from previously received signals on the same or a similar wireless channel. Additionally or alternatively, the set of equalizer taps may be based on measurements received from other wireless devices or on known conditions associated with the wireless device or channel.

In some embodiments, the second set of complex filter taps may be defined by the equations:

$$v_r(n)=h_r(n)+\beta h_i(n), \text{ and}$$

$$v_i(n)=(1+\alpha)h_i(n),$$

where $v_r(n)$ is a real component of the second set of complex filter taps for the nth delay line stage, and $v_i(n)$ is an imaginary component of the second set of complex filter taps for the nth delay line stage.

Thus, in the example of FIG. 3, the real output of the nth stage of the in-phase delay line may be obtained by multiplying the sample of the signal stored in the storage element 305 at that stage of the in-phase delay line by $w_r(n)$ at one of the multiplier elements 310. The imaginary output of the nth stage of the in-phase delay line may be obtained by multiplying the sample of the signal stored in the storage element 305 at that stage by $v_i(n)$ at another of the multiplier elements 310. The real output of the nth stage of the quadrature delay line may be obtained by multiplying the sample of the signal stored at the storage element 305 at that stage of the quadrature delay line by $v_r(n)$ at another of the multiplier elements 310. The imaginary output of the nth stage of the quadrature delay line may be obtained by multiplying the sample of the signal stored at the storage element 305 at that stage of the quadrature delay line by $-w_i(n)$ at another of the multiplier elements 310-c).

A first summer 325-a may be used to sum the stage outputs associated with the first set of coefficients w to obtain an in-phase output $Y_i$ of the compensation equalization filter 220-a. Likewise, a second summer 325-b may be used to sum the stage outputs associated with the second set of coefficients v to obtain a quadrature output $Y_q$ of the compensation equalization filter 220-a.

In some embodiments of the compensation equalization filter 220-a, the center tap of the first or second delay line may be adjusted to compensate for measured or estimated channel skew between the in-phase and quadrature components of the signal. For example, if the wireless device is pre-compensating and equalizing a signal to be transmitted on the wireless channel, the wireless device may receive one or more measurement reports from a receiving wireless device from which the channel skew of the wireless device may be determined or inferred. If the wireless device is performing post-compensation of the imbalances or impairments in a received signal, the wireless device may measure the skew of from the received signal directly or from previously received signals on the same or a similar wireless device or channel. Additionally or alternatively, the channel skew may be determined based on measurements received from other wireless devices or on known conditions associated with the wireless channel.

The separate in-phase and quadrature delay lines may be included in the compensation equalization filter 220-a enable the filter to compensate for asymmetric impairments between the in-phase and quadrature components of the signal. In certain examples, the compensation equalization filter 220-a may be considered as the joining of two half filters to create a single composite complex filter which may apply different compensation functions separately to the I and Q components of the signal.

Figure 4A:
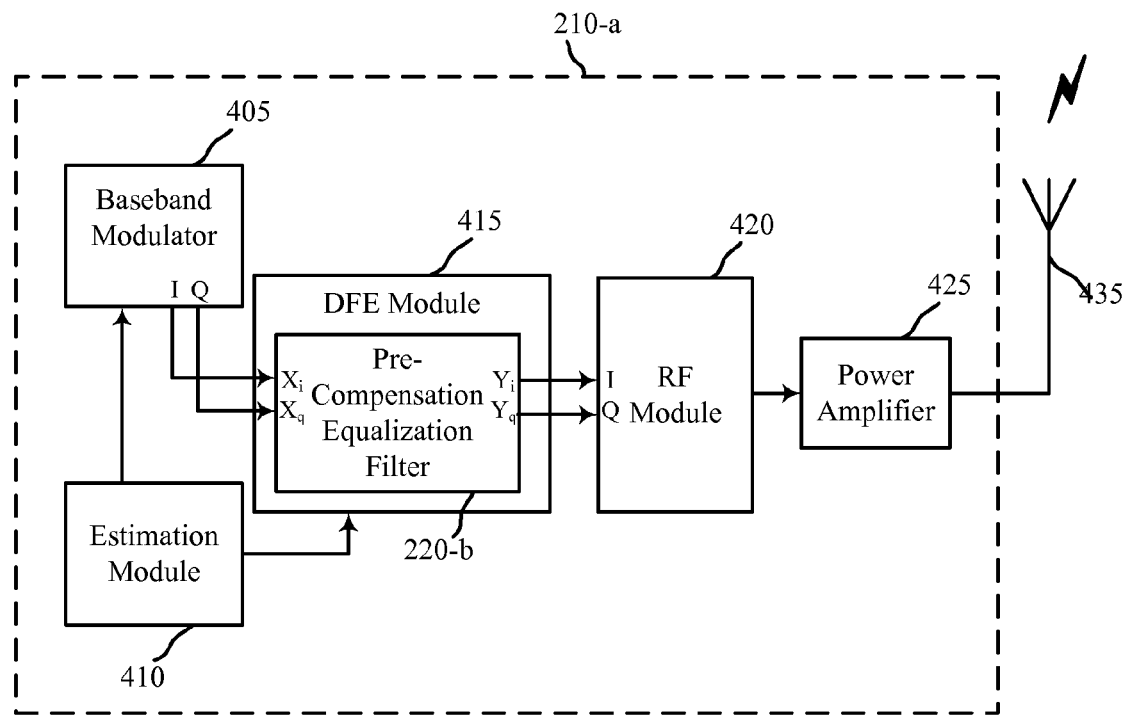
FIG. 4A is a block diagram illustrating one example of a modem in accordance with various embodiments.

FIG. 4A is a block diagram 400 illustrating one embodiment of a transmit path through a modem 210-a of a transmitting wireless device. The modem 210-a may be an example of the modem 210 described in FIG. 2. In one example, the modem 210-a may include various components included in a transmit path of the wireless device. For example, the modem 210-a may include a baseband modulator 405, an estimation module 410, a digital front end (DFE) module 415, a radio frequency (RF) module 420, and a power amplifier (PA) 425. Each of these components may be in communication with each other, directly or indirectly.

In one configuration, the baseband modulator 405 may modulate a baseband signal and the in-phase (I) and quadrature (Q) components of the modulated signal may be passed to the DFE module 415. In one example, the baseband modulator 405 may be part of the DFE module 415. The DFE module 415 may perform various digital signal processing (DSP) techniques on the modulated baseband signal and the digital signal may be converted to an analog signal and passed to the RF module 420. The RF module 420 may filter the analog signal and the power amplifier 425 may amplify the analog signal before the signal is transmitted via an antenna 435 of the modem 210-a.

In some embodiments, the DFE module 415 may include a pre-compensation equalization filter 220-b. The pre-compensation equalization filter 220-b may be an example of the pre-compensation equalization filter 220 illustrated in FIGS. 2 and/or 3. The pre-compensation equalization filter 220-b may include I/Q inputs $X_i$, $X_q$ and I/Q outputs $Y_i$, $Y_q$ corresponding to the pre-equalization inputs and post-equalization outputs shown in the example of FIG. 2. The I/Q inputs of the compensation equalization filter 220-b may be coupled to receive I/Q signals from the baseband modulator 405, and the I/Q outputs of the compensation equalization filter 220-b may be coupled to provide I/Q signals to the RF module 420.

The estimation module 410 may estimate various impairments of the transmit path of the modem 210-a, particularly impairments introduced into the signal by components of the analog pipeline (e.g., the RF module 420 and the power amplifier 425). The estimation module 410 may calculate digital pre-distortion coefficients for linearization of the power amplifier 425. In one embodiment, the calculated coefficients may be transferred to the baseband modulator 405 and the DFE module 415. The estimation module 410 may also calculate pre-compensation coefficients (e.g., α and β) used by the pre-compensation equalization filter 220-b. The coefficients α and β may estimate gain and phase impairments and imbalances of the wireless signal introduced by analog components of the transmit or receive path. The measurement(s) may be received, for example, from a receiver included in the receiver module 205 described with reference to FIG. 2. The measurement(s) may be based on, for example, measurements taken at a transmitter included in the transmitter module 215 described with reference to FIG. 2. In some cases, a measurement (e.g., a measurement of a channel condition) may be used to index a lookup table and obtain the coefficient α or β, or the I/Q skew value of the wireless device.

The estimation module 410 may additionally measure or estimate the passband characteristics of the wireless device, including gain and phase variation impairments across the passband of the wireless device, to determine equalization taps (e.g., $h_r$ and $h_i$) to pre-compensate the signal for the gain and phase variation impairments across the passband. The passband characteristics may be derived from measurements received from a mobile device, known characteristics of the wireless device, and/or other known sources of information about the wireless channel characteristics.

The estimation module 410 may provide the I/Q imbalance coefficients, the I/Q skew, and/or the equalization taps associated with the wireless device to the DFE module 415, and the DFE module 415 may configure the pre-compensation equalization filter 220-b to pre-compensate for these impairments as described, for example, with relation to FIG. 3.

Figure 4B:
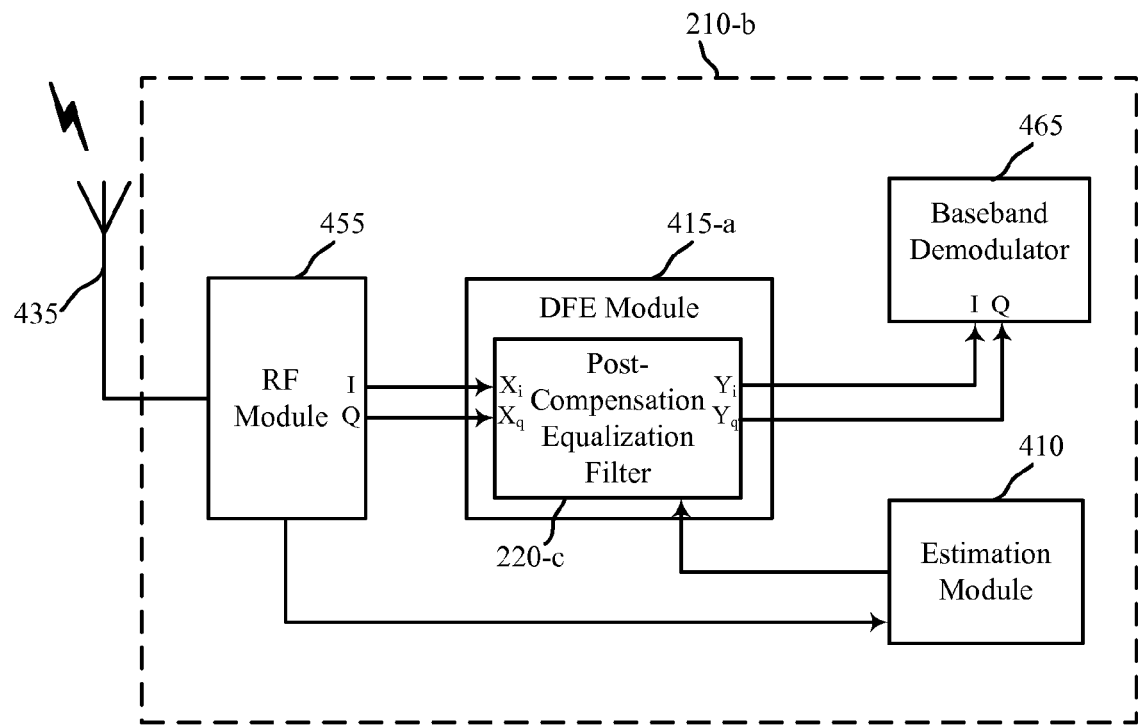
FIG. 4B is a block diagram illustrating another example of a modem in accordance with various embodiments.

FIG. 4B is a block diagram 450 illustrating one embodiment of a receive path through a modem 210-b of a transmitting wireless device. The modem 210-b may be an example of one or more of the modems 210 described in FIG. 2 or 4A. In one example, the modem 210-b may include various components included in a receive path of the wireless device. For example, the modem 210-b may include a radio frequency (RF) module 455, a digital front end (DFE) module 415-a, an estimation module 410, and a baseband demodulator 465. Each of these components may be in communication with each other, directly or indirectly.

In one configuration, the RF module 455 may receive a signal over a wireless channel, perform analog filtering of the received signal. Following this filtering, the received signal may be converted to a digital signal, and the in-phase (I) and quadrature (Q) components of the digital signal may be passed to the DFE module 415-a. The DFE module 415-a may perform various digital signal processing techniques on the received signal and pass the digital signal to the baseband demodulator 465 to recover the data from the signal. In one example, the baseband demodulator 465 may be part of the DFE module 415-a.

In some embodiments, the DFE module 415-a may include a post-compensation equalization filter 220-c. The post-compensation equalization filter 220-c may be an example of one or more of the compensation equalization filters 220 illustrated in FIGS. 2, 3, and/or 4A. The post-compensation equalization filter 220-c may include I/Q inputs $X_i$, $X_q$ and I/Q outputs $Y_i$, $Y_q$ corresponding to the pre-equalization inputs and post-equalization outputs shown in the example of FIG. 2 and FIG. 3A. The I/Q inputs of the compensation equalization filter 220-c may be coupled to receive I/Q signals from the RF module 455, and the I/Q outputs of the compensation equalization filter 220-c may be coupled to provide I/Q signals to the baseband demodulator 465.

The estimation module 410 may estimate various impairments of the receive path of the modem 210-a, particularly impairments introduced by components of the analog pipeline (e.g., the RF module 455) of the modem and the wireless device. The estimation module 410 may calculate post-compensation coefficients (e.g., α and β) used by the post-compensation equalization filter 220-c. The coefficients α and β may estimate gain and phase impairments and imbalances of the transmit path of a transmitting wireless device and/or the receive path of the modem 210-b, and may be based on one or measurements of the wireless device. The modem 210-b may make measurement(s), for example, of the received signal or another signal received on the same or a similar wireless channel (e.g., a reference signal, etc.) to identify the gain and phase impairments and imbalances of the transmit path of the transmitting wireless device and/or the receive path of the modem 210-b. In some cases, a measurement (e.g., a measurement of a channel condition) may be used to index a lookup table and obtain the coefficient α or β, or the I/Q skew value of the wireless device.

The estimation module 410 may additionally measure or estimate the passband characteristics of the wireless device, including gain and phase variation impairments across the passband of the wireless device, to determine equalization taps (e.g., $h_r$ and $h_t$) to post-compensate the signal for the gain and phase variation impairments across the passband. The passband characteristics may be derived from measurements made at the modem 210-b, known characteristics of the wireless device, and/or other known sources of information about the wireless device characteristics.

The estimation module 410 may provide the I/Q imbalance coefficients, the I/Q skew, and/or the equalization taps associated with the wireless device to the DFE module 415, and the DFE module 415 may configure the pre-compensation equalization filter 220-b to pre-compensate for these impairments as described, for example, with relation to FIG. 3.

Figure 5A:
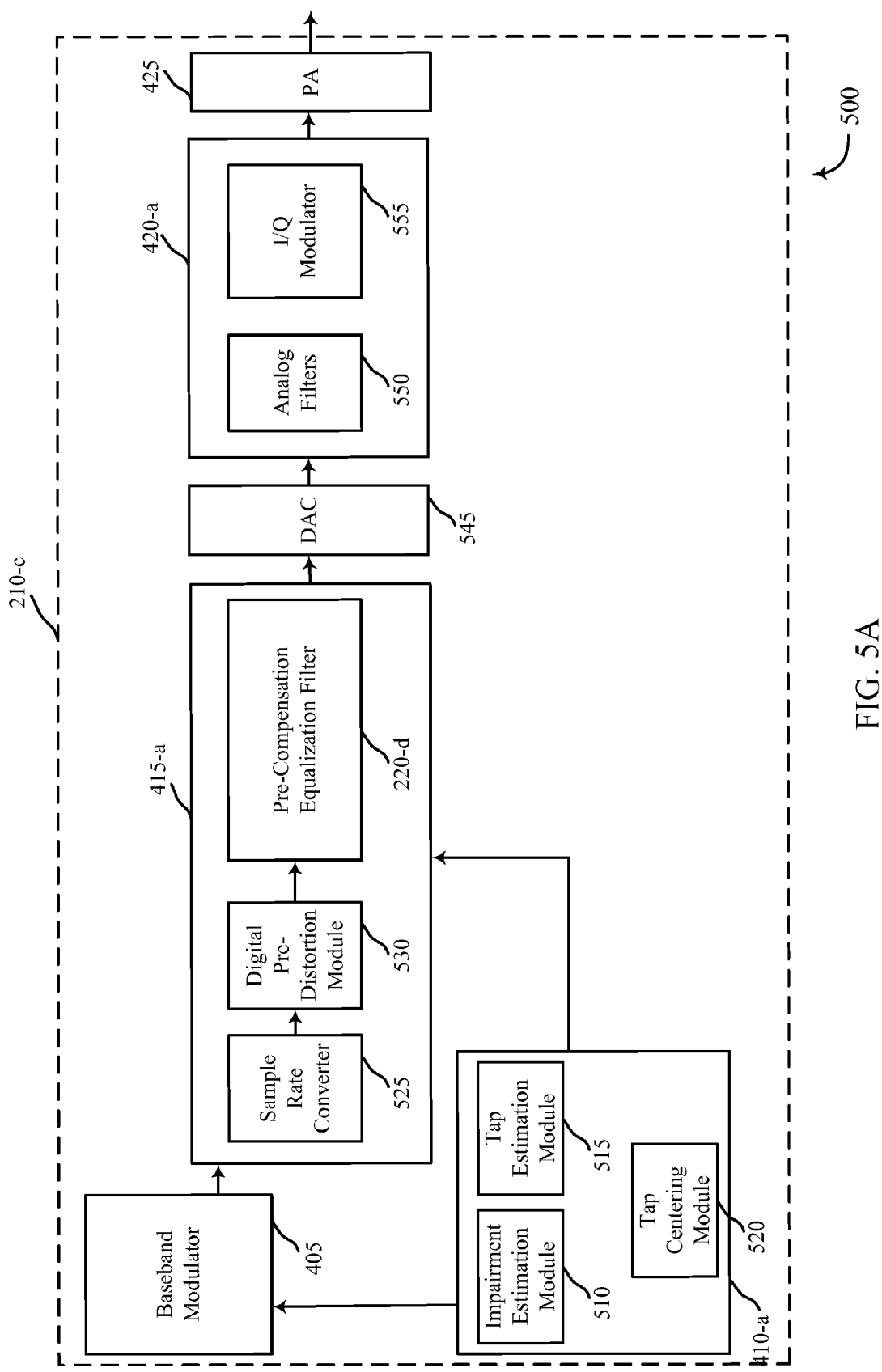
FIG. 5A is a block diagram illustrating another example of a modem in accordance with various embodiments.

FIG. 5A is a block diagram illustrating a further embodiment of a transmit path 500 of a modem 210-c in accordance with various embodiments. The modem 210-c may be an example of the modem 210 described in FIGS. 2, 4A, and/or 4B. In one example, the modem 210-c may include various components included in a transmit path of a base station 105 or mobile device 115. For example, the modem 210-c may include a baseband modulator 405, an estimation module 410-a, a DFE module 415-a, a digital-to-analog converter (DAC) 545, an RF module 420-a, and a power amplifier 425. The DFE module 415-a may include a sample rate converter 525, a digital pre-distortion module 530, and a pre-compensation equalization filter 220-d. The RF module 420-a may include analog filters 550 and an I/Q modulator 555.

In one configuration, the baseband modulator 405 may modulate a baseband signal and the in-phase (I) and quadrature (Q) components of the modulated signal may be passed to the DFE module 415-a. In one example, the baseband modulator 405 may be part of the DFE module 415. The DFE module 415 may perform various digital signal processing (DSP) techniques on the modulated baseband signal, including sample rate conversion (e.g., at sample rate converter 525), digital pre-distortion (e.g., at digital pre-distortion module 530), and pre-compensation and equalization (e.g., at pre-compensation equalization filter 220-d). The digital pre-distortion module 530 and pre-compensation equalization filter 220-d may compensate for various impairments that may be introduced by analog and RF components (e.g., DAC 545, analog filters 550, in-phase/quadrature (I/Q) modulator 555, power amplifier 425, etc.), also referred to as the analog pipeline of the modem 210-c or wireless device. These impairments may include mismatches between the gain and phase of I/Q components, local oscillator (LO) leakage, gain variations, and non-linear effects. In some embodiments, the impairments may be subject to thermal and temporal variations. The impairment estimation module 510 may estimate the impairments introduced by the analog and RF components such as the analog filters 550, I/Q modulator 555, and power amplifier 425. With respect to impairments introduced by the power amplifier 425, the impairment estimation module 510 may provide pre-distortion coefficients to the digital pre-distortion module 530. With respect to impairments introduced by the analog filters 550 and I/Q modulator 555, the impairment estimation module 510 may provide pre-compensation coefficients to the tap estimation module 515 and/or the pre-compensation equalization filter 220-d. An example of the pre-compensation equalization filter 220-d is described with reference to FIG. 3.

The tap estimation module 515 may estimate or determine a set of equalizer taps for the modem 210-c, and may also estimate or determine a first set of complex filter taps and a second set of complex filter taps by modifying the set of equalizer taps according to an estimated imbalance of the wireless device, specifically the transmit path 500 of the modem 210-c, as determined by the impairment estimation module 510. The tap estimation module 515 may then use the estimated/determined taps to configure the pre-compensation equalization filter.

The tap centering module 520 may determine a skew between the in-phase and quadrature components of the signal transmitted or to be transmitted on a wireless channel (e.g., the signal output by the power amplifier 425) and determine, based on the determined skew, an adjustment to a center tap position for at least one of the delay lines of the pre-compensation equalization filter 220-*d*.

The operations performed by the impairment estimation module 510, tap estimation module 515, and tap centering module 520 may be performed at periodic or aperiodic intervals.

Figure 5B:
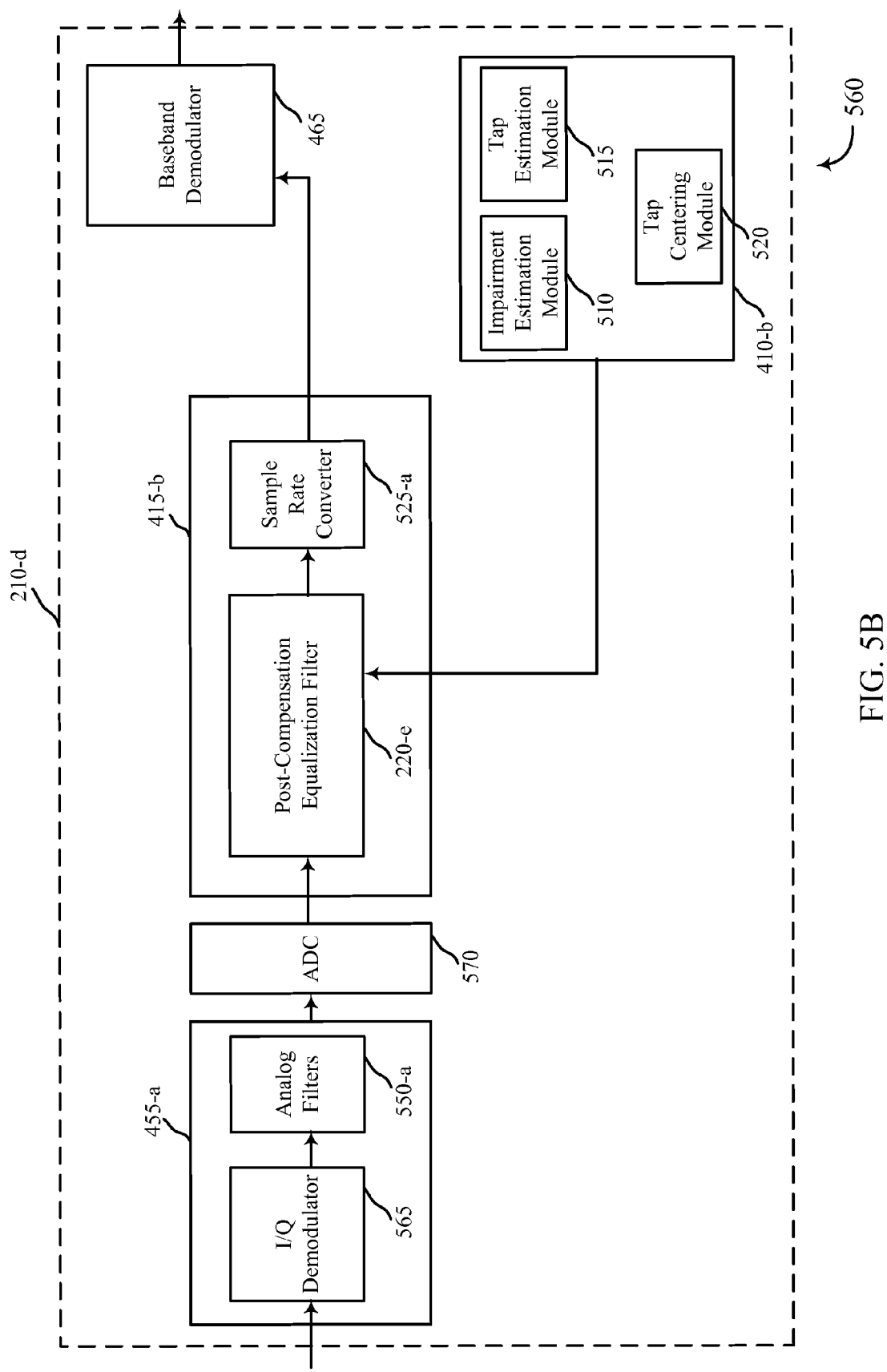
FIG. 5B is a block diagram illustrating another example of a modem in accordance with various embodiments.

FIG. 5B is a block diagram illustrating a further embodiment of a receive path 560 of a modem 210-*d* of a wireless device in accordance with various embodiments. The modem 210-*d* may be an example of one or more of the modems 210 described in FIG. 2, 4A-4B, or 5A. In one example, the modem 210-*d* may include various components included in a receive path of a base station 105 or mobile device 115. For example, the modem 210-*d* may include a RF module 455-*a*, an analog-to-digital converter (ADC), a DFE module 415-*b*, a baseband demodulator 465, and an estimation module 410-*b*. The RF module 455-*a* may include an I/Q demodulator 565 and analog filters 550-*a*. The DFE module 415-*b* may include a post-compensation equalization filter 220-*e* and a sample rate converter 525-*a*.

The DFE module 415-*b* may perform various digital signal processing (DSP) techniques on the modulated baseband signal, including post-compensation and equalization (e.g., at post-compensation equalization filter 220-*e*) and sample rater conversion (e.g., at sample rate converter 525-*a*). The post-compensation equalization filter 220-*e* may compensate for various impairments that may be introduced by analog and RF components (e.g., analog filters 550, in-phase/quadrature (I/Q) modulator 555, power amplifier 425, etc.), also referred to as the analog pipeline of the modem 210-*d* or wireless device, in the receive path of the modem 210-*d* and in the wireless channel on which a signal is received. These impairments may include mismatches between the gain and phase of I/Q components, local oscillator (LO) leakage, gain variations, and non-linear effects. In some embodiments, the impairments may be subject to thermal and temporal variations. The impairment estimation module 510 of the estimation module 410-*b* may estimate the impairments introduced by the analog and RF components such as the analog filters 550, I/Q modulator 555, and power amplifier 425, and/or by the wireless channel. The impairment estimation module 510 may provide post-compensation coefficients to the tap estimation module 515 and/or the post-compensation equalization filter 220-*e*. An example of the post-compensation equalization filter 220-*e* is described with reference to FIG. 3

The tap estimation module 515 may estimate or determine a set of equalizer taps for the wireless device, and specifically for the analog pipeline of the receive path 560 of the modem 210-*d*, and may also estimate or determine a first set of complex filter taps and a second set of complex filter taps by modifying the set of equalizer taps according to an estimated imbalance of the wireless channel determined by the impairment estimation module 510. The tap estimation module 515 may then use the estimated/determined taps to configure the post-compensation equalization filter 220-*e*.

The tap centering module 520 may determine a skew between the in-phase and quadrature components of the signal received at RF module 420-*a* and determine, based on the determined skew, an adjustment to a center tap position for at least one of the delay lines of the post-compensation equalization filter 220-*e*.

The operations performed by the impairment estimation module 510, tap estimation module 515, and tap centering module 520 may be performed at periodic or aperiodic intervals.

The output of the DFE module 415-*b* may be coupled with the baseband demodulator 465, which may demodulate digital data from the filtered signal for further processing. In one example, the baseband demodulator 465 may be part of the DFE module 415.

Figure 6:
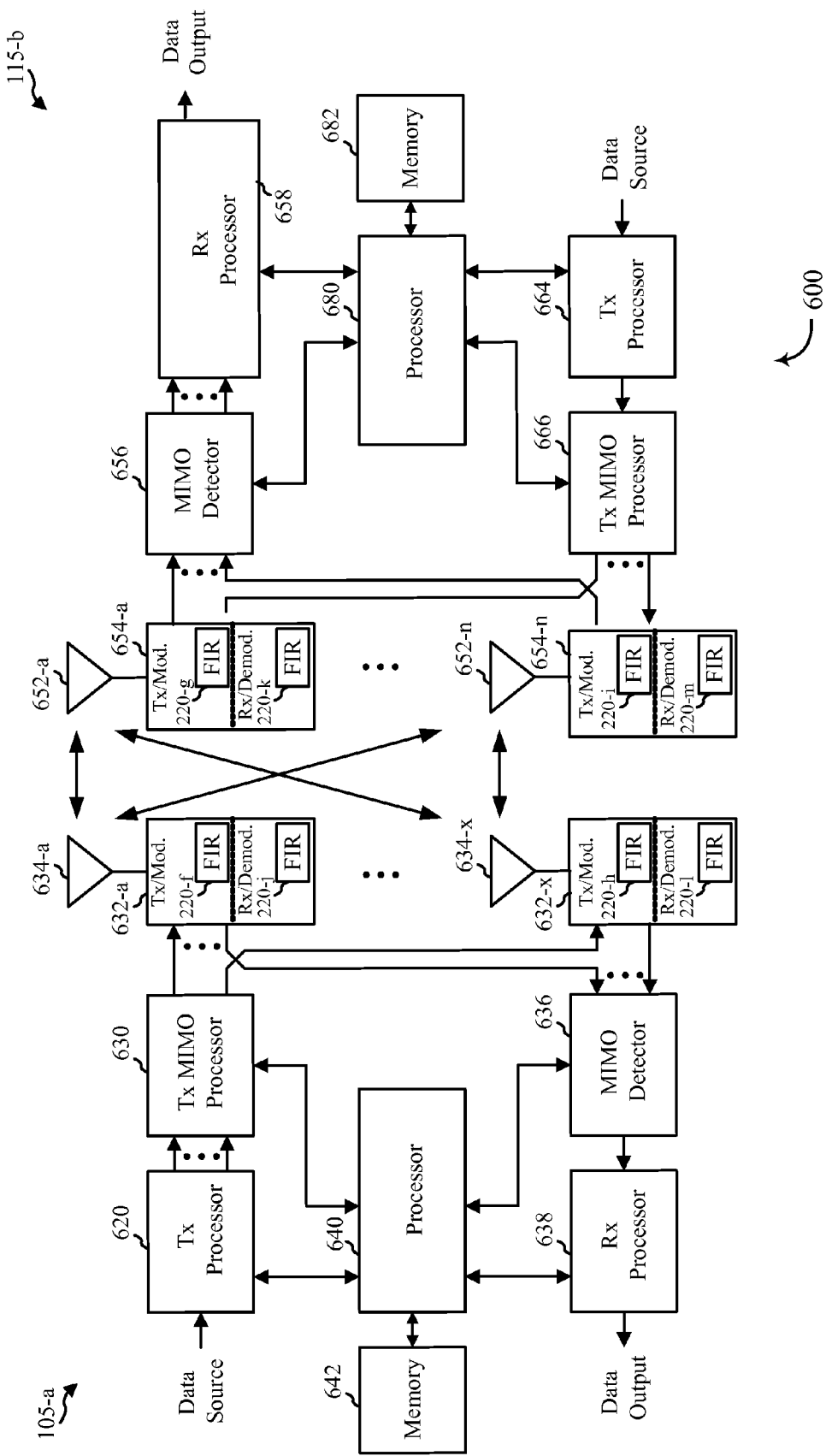
FIG. 6 is a block diagram of a MIMO communication system including a base station and a mobile device.

FIG. 6 is a block diagram of a MIMO wireless communication system 600 including a base station (e.g., eNB) 105-*a* and a mobile device (e.g., UE) 115-*a*. The MIMO wireless communication system 600 may illustrate aspects of the wireless communication system 100 of FIG. 1. The base station 105-*a* may be equipped with base station antennas 634-*a* through 634-*x*, and the mobile device 115-*a* may be equipped with mobile device antennas 652-*a* through 652-*n*. In the MIMO wireless communication system 600, the base station 105-*a* may be able to send data over multiple communication links at the same time. Each communication link may be called a "layer" and the "rank" of the communication link may indicate the number of layers used for communication. For example, in a 2×2 MIMO system where base station 105-*a* transmits two "layers," the rank of the communication link between the base station 105-*a* and the mobile device 115-*a* is two.

At the base station 105-*a*, a transmit processor 620 may receive data from a data source. The transmit processor 620 may process the data. The transmit processor 620 may generate reference symbols, and a cell-specific reference signal. A transmit (TX) MIMO processor 630 may perform spatial processing (e.g., precoding) on data symbols, control symbols, and/or reference symbols, if applicable, and may provide output symbol streams to the base station modulator/demodulators 632-*a* through 632-*x*. Each base station modulator/demodulator 632 may process a respective output symbol stream (e.g., for OFDM, etc.) to obtain an output sample stream. Each base station modulator/demodulator 632 may further process (e.g., convert to analog, amplify, filter, and upconvert) the output sample stream to obtain a wireless signal. Each base station modulator/demodulator 632 may include a pre-compensation equalization filter 220 to perform pre-compensation and equalization on the signal to be transmitted, consistent with the principles of the present specification. The pre-compensation equalization filters 220 may be implemented as finite impulse response (FIR) filters, and may be an example of one or more of the compensation equalization filters 220 described in the previous Figures. In one example, wireless signals from base station modulator/demodulators 632-*a* through 632-*x* may be transmitted via the base station antennas 634-*a* through 634-*x*, respectively.

At the mobile device 115-*a*, the mobile device antennas 652-*a* through 652-*n* may receive the wireless signals from the base station 105-*a* and may provide the received signals to the mobile device modulator/demodulators 654-*a* through 654-*n*, respectively. Each mobile device modulator/demodulator 654 may condition (e.g., filter, amplify, downconvert, and digitize) a respective received signal to obtain input samples. Each mobile device modulator/demodulator 654 may include a post-compensation equalization filter 220 to perform pre-compensation and equalization on the signal to be transmitted, consistent with the principles of the present specification. The post-compensation equalization filters 220 may be implemented as finite impulse response (FIR) filters, and may be an example of one or more of the compensation equalization filters 220 described in the previous Figures. Each mobile device modulator/demodulator 654 may further process the input samples (e.g., for OFDM, etc.) to obtain received symbols. A MIMO detector 656 may obtain received symbols from all the mobile device modulator/demodulators 654-*a* through 654-*n*, perform MIMO detection on the received symbols if applicable, and provide detected symbols. A receive processor 658 may process (e.g., demodulate, deinterleave, and decode) the detected symbols, providing decoded data for the mobile device 115-*a* to a data output, and provide decoded control information to a processor 680, or memory 682.

On the uplink, at the mobile device 115-*a*, a transmit processor 664 may receive and process data from a data source. The transmit processor 664 may also generate reference symbols for a reference signal. The symbols from the transmit processor 664 may be precoded by a transmit MIMO processor 666 if applicable, further processed by the mobile device modulator/demodulators 654-*a* through 654-*n* (e.g., for SC-FDMA, etc.), and be transmitted to the base station 105-*a* in accordance with the transmission parameters (e.g., an identification of allocated resources) received from the base station 105-*a*. At the base station 105-*a*, the uplink signals from the mobile device 115-*a* may be received by the base station antennas 634, processed by the base station modulator/demodulators 632, detected by a MIMO detector 636 if applicable, and further processed by a base station receive processor 638. The base station receive processor 638 may provide decoded data to a data output and to the base station processor 640 and/or memory 642 associated with the base station processor 640.

The components of the mobile device 115-*a* may, individually or collectively, be implemented with one or more Application Specific Integrated Circuits (ASICs) adapted to perform some or all of the applicable functions in hardware. Each of the noted modules may be a means for performing one or more functions related to operation of the MIMO wireless communication system 600. Similarly, the components of the base station 105-*a* may, individually or collectively, be implemented with one or more Application Specific Integrated Circuits (ASICs) adapted to perform some or all of the applicable functions in hardware. Each of the noted components may be a means for performing one or more functions related to operation of the MIMO wireless communication system 600.

Figure 7:
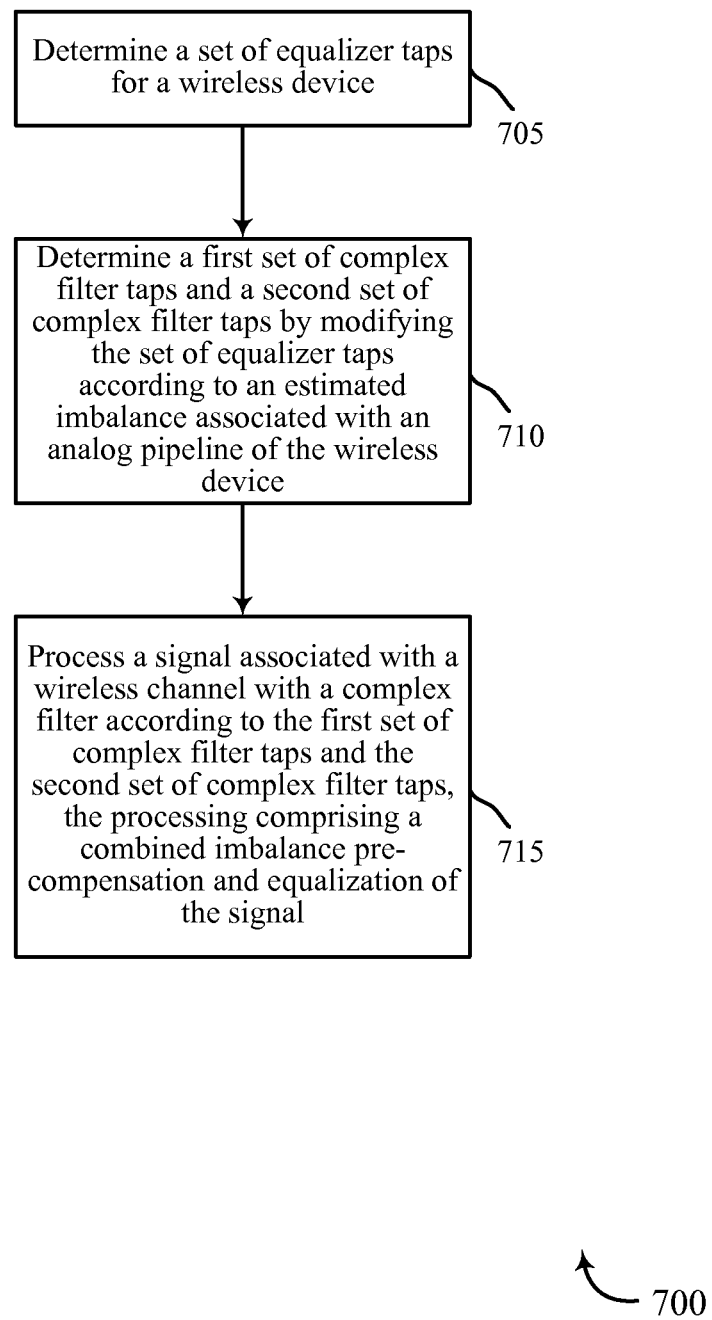
FIG. 7 is a flow chart illustrating an example of a method of compensating for impairments of a wireless device.

FIG. 7 is a flow chart illustrating an example of a method 700 of compensating for impairments of a wireless device. For clarity, the method 700 is described below with reference to one of the base stations 105, mobile devices 115, or wireless devices 201 shown in FIGS. 1-6. In some implementations, the modem 210 or compensation equalization filter 220 may perform the functions described below or execute one or more sets of codes to control the functional elements of a base station 105, mobile device 115, or a wireless device 201 to perform the functions described below.

At block 705, a set of equalizer taps may be determined for the wireless device. As discussed with reference to FIG. 3, the equalizer taps may be determined based on measured or estimated passband characteristics of the analog pipeline (i.e. the transmit or receive path) of the wireless device. In certain examples, the equalizer taps may be determined by measuring an impulse response associated with the analog pipeline of the wireless device and calculating an equalizing impulse response. The equalizing impulse response may be calculated such that a product of the equalizing impulse response and the impulse response of the analog pipeline is substantially free from inter-symbol interference and/or distortion. The set of equalizer taps may be derived from the equalizing impulse response, and may be calculated using automatic synthesis or adaptation techniques.

At block 710, a first set of complex filter taps and a second set of complex filter taps may be determined for the wireless device by modifying the set of equalizer taps according to an estimated imbalance associated with the analog pipeline (e.g., DAC 545, RF module 420 and power amplifier 425 of FIGS. 4A and 5A, or RF module 455 and ADC 570 of FIGS. 4B and 5B) of the wireless device.

At block 715, a signal associated with a wireless channel may be processed with a complex filter according to the first set of complex filter taps and the second set of complex filter taps. The processing may include a combined imbalance pre-compensation and equalization of the signal for a signal to be transmitted on the wireless channel, or a combined imbalance post-compensation and equalization of a signal received by the wireless device over the wireless channel. More specifically, the processing may involve passing an in-phase component of the signal through a multi-stage in-phase delay line of the complex filter, and passing a quadrature component of the signal through a multi-stage quadrature delay line of the complex filter. Each stage of the in-phase delay line and the quadrature delay line may provide a real output and an imaginary output.

Thus, the method 700 may compensate for impairments of a wireless device, including impairments introduced by transmit or receive components of a modem. The method 700 may be performed at a transmitting wireless device on a transmit path to pre-compensate and equalize a signal to be transmitted over the wireless channel and/or at a receiving wireless device on a receive path to post-compensate for impairments associated with the received signal. It should be noted that the method 700 is just one implementation and that the operations of the method 700 may be rearranged or otherwise modified such that other implementations are possible.

Figure 8:
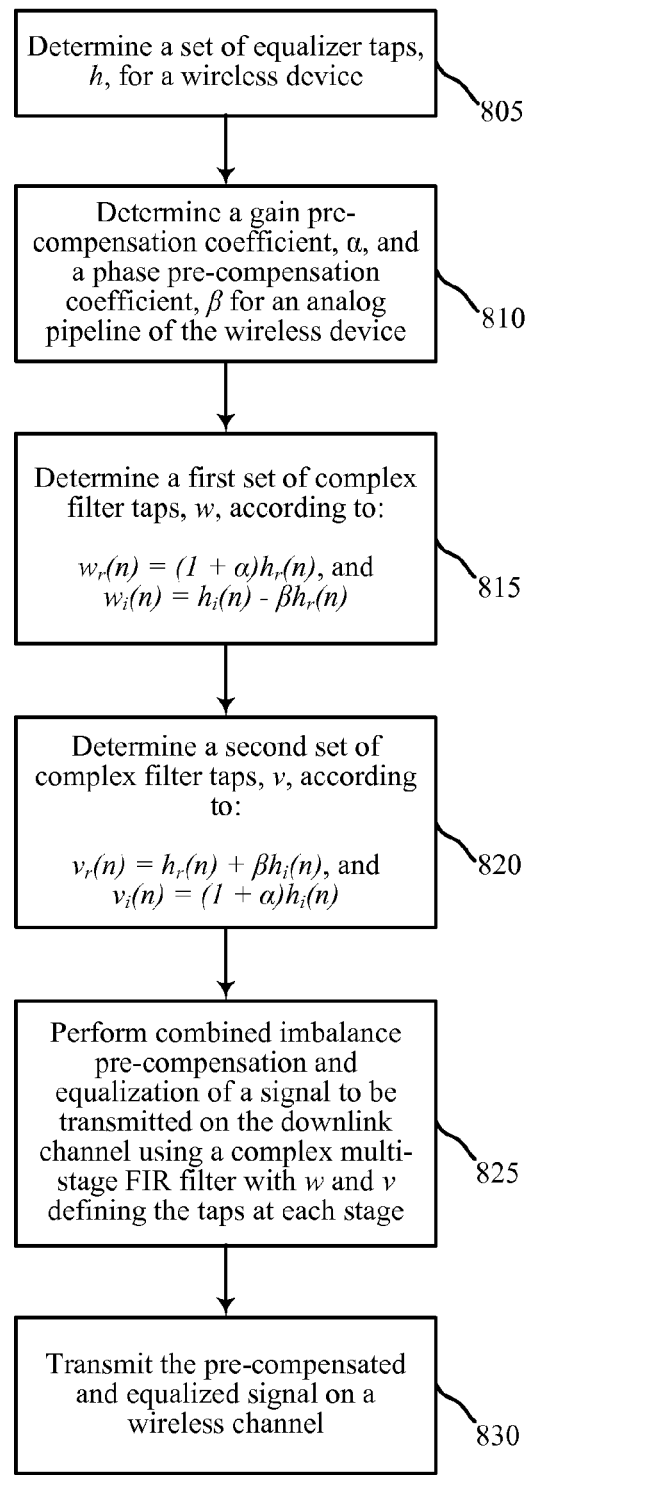
FIG. 8 is a flow chart illustrating another example of a method of compensating for impairments of a wireless device.

FIG. 8 is a flow chart illustrating another example of a method 800 of compensating for impairments of a wireless device. For clarity, the method 800 is described below with reference to one of the base stations 105, mobile devices 115, or wireless devices 201 shown in FIGS. 1-6. In some implementations, the modem 210 or compensation equalization filter 220 may perform the functions described below or execute one or more sets of codes to control the functional elements of a base station 105, mobile device 115, or wireless device 201 to perform the functions described below.

At block 805, a set of equalizer taps, h, may be determined for the wireless device. As discussed with reference to FIG. 3, the equalizer taps may be determined based on measured or estimated passband characteristics of the analog pipeline (i.e. the transmit or receive path) of the wireless device. In certain examples, the equalizer taps may be determined by measuring an impulse response associated with the analog pipeline of the wireless device and calculating an equalizing impulse response. The equalizing impulse response may be calculated such that a product of the equalizing impulse response and the impulse response of the analog pipeline is substantially free from inter-symbol interference and/or distortion. The set of equalizer taps may be derived from the equalizing impulse response, and may be calculated using automatic synthesis or adaptation techniques.

At block 810, a gain pre-compensation coefficient, $\alpha$, and a phase pre-compensation coefficient, $\beta$, may be determined for impairments introduced to the wireless signal by an analog pipeline of the wireless device. The gain pre-compensation coefficient $\alpha$ and the phase pre-compensation coefficient $\beta$ may be determined by measuring imbalances in gain or phase between in-phase and quadrature components of the transmit or receive path of the wireless device.

A first set of complex filter taps, w, for the wireless device may be determined at block 815, and a second set of complex filter taps, v, for the wireless device may be determined at block 820. At least one or both of the first set of complex filter taps and the second set of complex filter taps may be based on the set of equalizer taps, h, the gain pre-compensation coefficient, α, and the phase pre-compensation coefficient, β.

In some embodiments, the first set of complex filter taps, w, may be determined, at block 815, by modifying the set of equalizer taps, h, according to an estimated imbalance of the analog pipeline of the wireless device. For example, the first set of complex filter taps may be defined by the equations:

$$w_r(n)=(1+\alpha)h_r(n), \text{ and}$$

$$w_i(n)=h_i(n)-\beta h_r(n),$$

where $w_r$ is a real component of the first set of complex filter taps, $w_i$ is an imaginary component of the first set of complex filter taps, n is a delay line stage of the complex filter, α is the gain pre-compensation coefficient, β is the phase pre-compensation coefficient, $h_r$ is a real component of the set of equalizer taps, and $h_i$ is an imaginary component of the set of equalizer taps.

In some embodiments, the second set of complex filter taps, v, may be determined, at block 820, by modifying the set of equalizer taps, h, according to an estimated imbalance of the analog pipeline of the wireless device. For example, the second set of complex filter taps may be defined by the equations:

$$v_r(n)=h_r(n)+\beta h_i(n), \text{ and}$$

$$v_i(n)=(1+\alpha)h_i(n),$$

where $v_r$ is a real component of the second set of complex filter taps, $v_i$ is an imaginary component of the second set of complex filter taps, n is a delay line stage of the complex filter, α is the gain pre-compensation coefficient, β is the phase pre-compensation coefficient, $h_r$ is a real component of the set of equalizer taps, and $h_i$ is an imaginary component of the set of equalizer taps.

At block 825, a combined imbalance pre-compensation and equalization of a signal to be transmitted by the wireless device may be performed. In some embodiments, the combined imbalance pre-compensation and equalization may be performed using a complex multi-stage finite impulse response (FIR) filter with w and v defining the taps at each of the filter's stages.

At block 830, the pre-compensated and equalized signal may be transmitted on a wireless channel by the wireless device.

Thus, the method 800 may compensate for impairments of an analog pipeline of a wireless device. It should be noted that the method 800 is just one implementation and that the operations of the method 800 may be rearranged or otherwise modified such that other implementations are possible.

Figure 9:
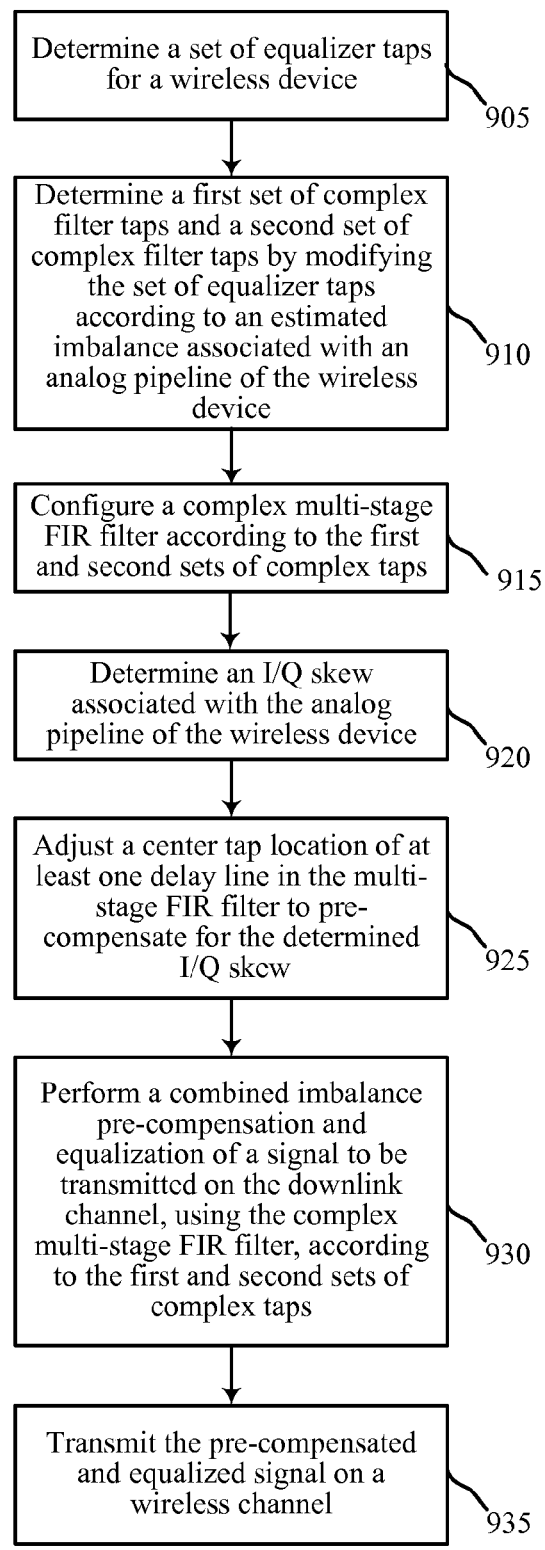
FIG. 9 is a flow chart illustrating yet another example of a method of compensating for impairments of a wireless device.

FIG. 9 is a flow chart illustrating yet another example of a method 900 of compensating for impairments of a wireless device. For clarity, the method 900 is described below with reference to one of the base stations 105, mobile devices 115, or wireless devices 201 shown in FIGS. 1-6. In some implementations, the modem 210 or compensation equalization filter 220 may perform the functions described below or execute one or more sets of codes to control the functional elements of a base station 105, mobile device 115, or wireless device 201 to perform the functions described below.

At block 905, a set of equalizer taps may be determined for the wireless device. As discussed with reference to FIG. 3, the equalizer taps may be determined based on measured or estimated passband characteristics of the analog pipeline (i.e. the transmit or receive path) of the wireless device. In certain examples, the equalizer taps may be determined by measuring an impulse response associated with the analog pipeline of the wireless device and calculating an equalizing impulse response. The equalizing impulse response may be calculated such that a product of the equalizing impulse response and the impulse response of the analog pipeline is substantially free from inter-symbol interference and/or distortion. The set of equalizer taps may be derived from the equalizing impulse response, and may be calculated using automatic synthesis or adaptation techniques.

At block 910, a first set of complex filter taps and a second set of complex filter taps may be determined for the wireless device by modifying the set of equalizer taps according to an estimated imbalance caused by or otherwise associated with an analog pipeline of the wireless device.

At block 915, a complex multi-stage finite impulse response (FIR) filter may be configured according to the first and second sets of complex taps determined at block 910. The complex multi-stage FIR filter may be configured, for example, according to the techniques described above with respect to FIG. 3. The complex multi-stage FIR filter may include a first complex half-filter associated with the first set of complex filter taps and a second complex half-filter associated with the second set of complex filter taps. Each complex half-filter may process both the in-phase and the quadrature components of the signal being transmitted or received.

At block 920, a skew between the in-phase and quadrature components of the signal (e.g., an I/Q skew) attributable to the analog pipeline of the wireless device may be determined. Then, at block 925, a center tap position for at least one of the delay lines of the FIR filter may be adjusted (e.g., shifted) based on the determined skew. In this manner, pre-compensation may be made for the determined I/Q skew.

At block 930, a combined imbalance pre-compensation and equalization of a signal to be transmitted on a wireless channel may be performed. In some embodiments, the combined imbalance pre-compensation and equalization may be performed, using the complex multi-stage FIR filter, according to the first and second sets of complex taps. More specifically, an in-phase component of the signal may be passed through a multi-stage in-phase delay line of the complex filter, and a quadrature component of the signal may be passed through a multi-stage quadrature delay line of the complex filter. Each stage of the in-phase delay line and the quadrature delay line may provide a real output and an imaginary output.

At block 935, the pre-compensated and equalized signal may be transmitted on the wireless channel.

Thus, the method 900 may compensate for impairments of an analog pipeline of a wireless device. It should be noted that the method 900 is just one implementation and that the operations of the method 900 may be rearranged or otherwise modified such that other implementations are possible.

Figure 10:
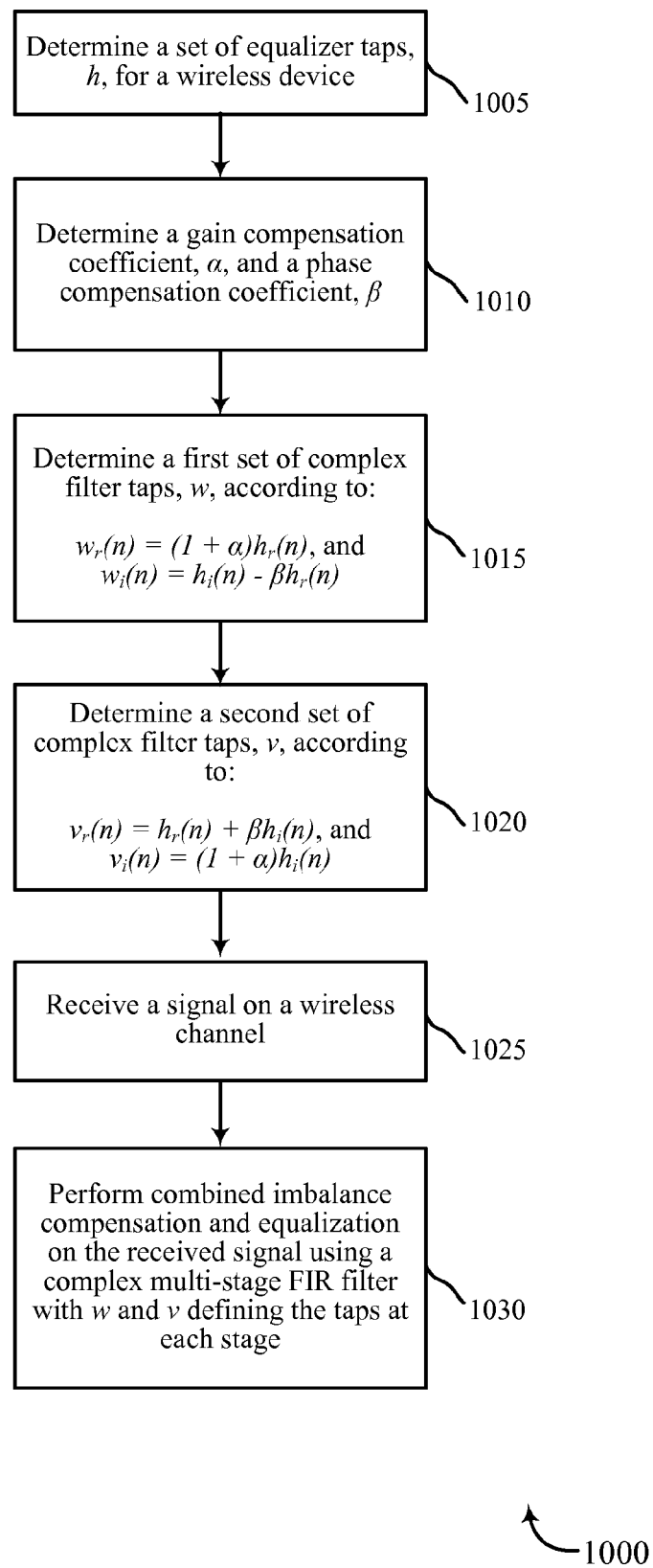
FIG. 10 is a flow chart illustrating another example of a method of compensating for impairments of a wireless device.

FIG. 10 is a flow chart illustrating another example of a method 1000 of compensating for impairments of a wireless device. For clarity, the method 1000 is described below with reference to one of the base stations 105, mobile devices 115, or wireless devices 201 shown in FIGS. 1-6. In some implementations, the modem 210 or compensation equalization filter 220 may perform the functions described below or execute one or more sets of codes to control the functional elements of a base station 105, mobile device, 115, or a wireless device 201 to perform the functions described below.

At block 1005, a set of equalizer taps, h, may be determined for the wireless device. As discussed with reference to FIG. 3, the equalizer taps may be determined based on measured or estimated passband characteristics of the analog pipeline (i.e. the transmit or receive path) of the wireless device. In certain examples, the equalizer taps may be determined by measuring an impulse response associated with the analog pipeline of the wireless device and calculating an equalizing impulse response. The equalizing impulse response may be calculated such that a product of the equalizing impulse response and the impulse response of the analog pipeline is substantially free from inter-symbol interference and/or distortion. The set of equalizer taps may be derived from the equalizing impulse response, and may be calculated using automatic synthesis or adaptation techniques.

At block 1010, a gain post-compensation coefficient, $\alpha$, and a phase post-compensation coefficient, $\beta$, may be determined for the wireless device. The gain post-compensation coefficient $\alpha$ and the phase post-compensation coefficient $\beta$ may be determined according to the principles described above with reference to previous Figures.

A first set of complex filter taps, w, for the wireless device may be determined at block 1015, and a second set of complex filter taps, v, for the wireless device may be determined at block 1020. At least one or both of the first set of complex filter taps and the second set of complex filter taps may be based on the set of equalizer taps, h, the gain post-compensation coefficient, $\alpha$, and the phase post-compensation coefficient, $\beta$.

In some embodiments, the first set of complex filter taps, w, may be determined, at block 1015, by modifying the set of equalizer taps, h, according to an estimated imbalance of the analog pipeline of the wireless device. For example, the first set of complex filter taps may be defined by the equations:

$$w_r(n) = (1+\alpha)h_r(n), \text{ and}$$

$$w_i(n) = h_i(n) - \beta h_r(n),$$

where $w_r$ is a real component of the first set of complex filter taps, $w_i$ is an imaginary component of the first set of complex filter taps, n is a delay line stage of the complex filter, $\alpha$ is the gain post-compensation coefficient, $\beta$ is the phase post-compensation coefficient, $h_r$ is a real component of the set of equalizer taps, and $h_i$ is an imaginary component of the set of equalizer taps.

In some embodiments, the second set of complex filter taps, v, may be determined, at block 1020, by modifying the set of equalizer taps, h, according to an estimated imbalance of the analog pipeline of the wireless device. For example, the second set of complex filter taps may be defined by the equations:

$$v_r(n) = h_r(n) + \beta h_i(n), \text{ and}$$

$$v_i(n) = (1+\alpha)h_i(n),$$

where $v_r$ is a real component of the second set of complex filter taps, $v_i$ is an imaginary component of the second set of complex filter taps, n is a delay line stage of the complex filter, $\alpha$ is the gain post-compensation coefficient, $\beta$ is the phase post-compensation coefficient, $h_r$ is a real component of the set of equalizer taps, and $h_i$ is an imaginary component of the set of equalizer taps.

At block 1025, a signal may be received on a wireless channel. The signal may be received over the receive path of the wireless device, as discussed above with reference to FIGS. 4B and 5B, and 6.

At block 1030, a combined imbalance post-compensation and equalization of the received signal may be performed. In some embodiments, the combined imbalance post-compensation and equalization may be performed using a complex multi-stage finite impulse response (FIR) filter with w and v defining the taps at each of the filter's stages.

Thus, the method 1000 may compensate for impairments of an analog pipeline of a wireless device. It should be noted that the method 1000 is just one implementation and that the operations of the method 1000 may be rearranged or otherwise modified such that other implementations are possible.

Figure 11:
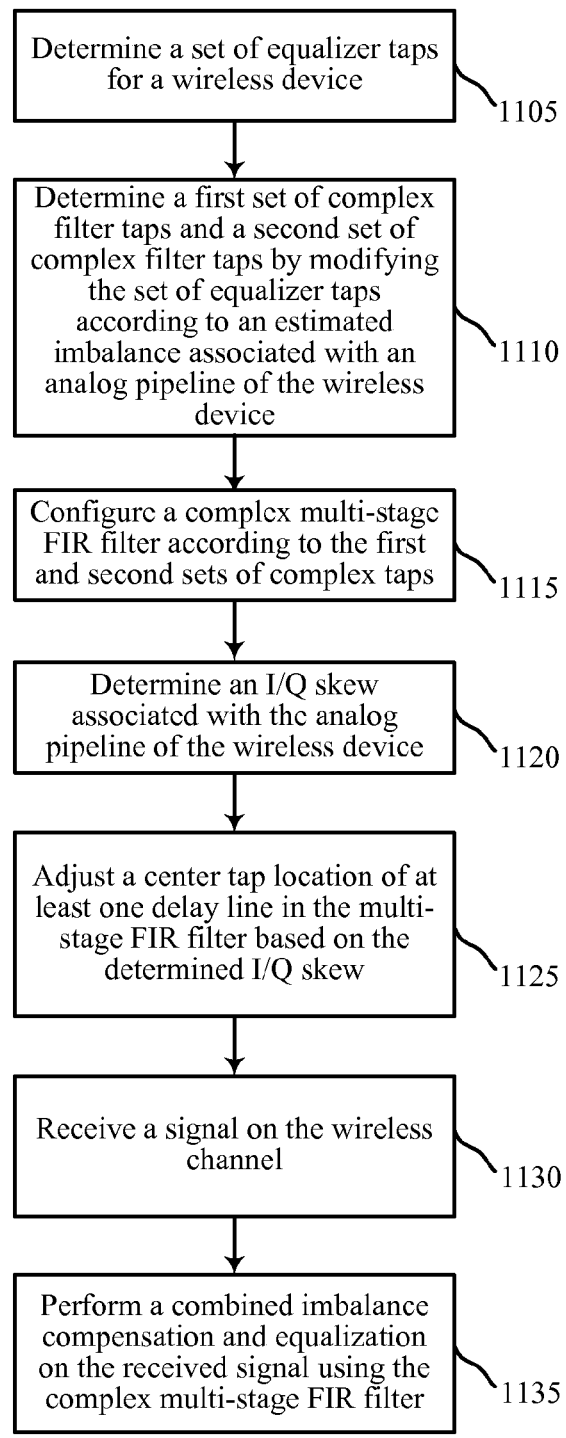
FIG. 11 is a flow chart illustrating yet another example of a method of compensating for impairments of a wireless device.

FIG. 11 is a flow chart illustrating yet another example of a method 1100 of compensating for impairments of a wireless device. For clarity, the method 1100 is described below with reference to one of the base stations 105, mobile devices 115, or wireless devices 201 shown in FIGS. 1-6. In some implementations, the modem 210 or compensation equalization filter 220 may perform the functions described below or execute one or more sets of codes to control the functional elements of a base station 105, mobile device 115, or a wireless device 201 to perform the functions described below.

At block 1105, a set of equalizer taps may be determined for the wireless device. As discussed with reference to FIG. 3, the equalizer taps may be determined based on measured or estimated passband characteristics of the analog pipeline (i.e. the transmit or receive path) of the wireless device. In certain examples, the equalizer taps may be determined by measuring an impulse response associated with the analog pipeline of the wireless device and calculating an equalizing impulse response. The equalizing impulse response may be calculated such that a product of the equalizing impulse response and the impulse response of the analog pipeline is substantially free from inter-symbol interference and/or distortion. The set of equalizer taps may be derived from the equalizing impulse response, and may be calculated using automatic synthesis or adaptation techniques.

At block 1110, a first set of complex filter taps and a second set of complex filter taps may be determined for the wireless device by modifying the set of equalizer taps according to an estimated imbalance of an analog pipeline of the wireless device.

At block 1115, a complex multi-stage finite impulse response (FIR) filter may be configured according to the first and second sets of complex taps determined at block 1110. The complex multi-stage FIR filter may be configured, for example, according to the techniques described above with respect to FIG. 3. The complex multi-stage FIR filter may include a first complex half-filter associated with the first set of complex filter taps and a second complex half-filter associated with the second set of complex filter taps. Each complex half-filter may process both the in-phase and the quadrature components of the signal being transmitted or received.

At block 1120, a skew between the in-phase/quadrature components (i.e., an I/Q skew) of a signal associated with the analog pipeline of the wireless device may be determined. Then, at block 1125, a center tap position for at least one of the delay lines of the FIR filter may be adjusted (e.g., shifted) based on the determined skew.

At block 1130, a signal may be received on a wireless channel. The signal may be received over the receive path of the wireless device, as discussed above with reference to FIGS. 4B and 5B, and 6. The receive path may include the analog pipeline.

At block 1135, a combined imbalance compensation and equalization of the received may be performed. In some embodiments, the combined imbalance compensation and equalization may be performed, using the complex multi-stage FIR filter, according to the first and second sets of complex taps. More specifically, an in-phase component of the signal may be passed through a multi-stage in-phase delay line of the complex filter, and a quadrature component of the signal may be passed through a multi-stage quadrature delay line of the complex filter. Each stage of the in-phase delay line and the quadrature delay line may provide a real output and an imaginary output.

Thus, the method 1100 may compensate for impairments of a wireless device. It should be noted that the method 1100 is just one implementation and that the operations of the method 1100 may be rearranged or otherwise modified such that other implementations are possible.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with at least one processor, such as a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

A computer program product or computer-readable media includes both computer-readable storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein, but is to be accorded the widest scope consistent with the principles and novel features disclosed herein.

What is claimed is:

1. A method of compensating for impairments of a wireless device, comprising:
   determining a set of equalizer taps for an analog pipeline of the wireless device;
   modifying the set of equalizer taps according to an estimated imbalance of the analog pipeline of the wireless device to determine a first set of complex filter taps and a second set of complex filter taps;
   processing a signal associated with the analog pipeline with a complex filter at the wireless device according to the first set of complex filter taps and the second set of complex filter taps, wherein the complex filter comprises a multi-stage in-phase delay line and a multi-stage quadrature delay line, the processing comprising a combined imbalance compensation and equalization of the signal, wherein the complex filter comprises a first complex half-filter associated with the first set of complex filter taps and a second complex half-filter associated with the second set of complex filter taps, and wherein each complex half-filter processes both an in-phase component of the signal and a quadrature component of the signal;
   summing a real output of each stage of the in-phase delay line with an imaginary output of each stage of the quadrature delay line to obtain an in-phase output of the complex filter; and
   summing an imaginary output of each stage of the in-phase delay line with a real output of each stage of the quadrature delay line to obtain a quadrature output of the complex filter.

2. The method of claim 1, wherein processing the signal further comprises:
   passing the in-phase component of the signal through the in-phase delay line of the complex filter; and
   passing the quadrature component of the signal through the quadrature delay line of the complex filter.

3. The method of claim 2, wherein processing the signal further comprises:
   obtaining the real output of each stage of the in-phase delay line by multiplying the signal at that stage of the in-phase delay line by a real filter tap associated with that stage from the first set of complex filter taps; and
   obtaining the imaginary output of each stage of the in-phase delay line of the complex filter by multiplying the signal at that stage by an imaginary filter tap associated with that stage from the second set of complex filter taps.

4. The method of claim 2, wherein processing the signal further comprises:
   obtaining the real output of each stage of the quadrature delay line by multiplying the signal at that stage of the quadrature delay line by a real filter tap associated with that stage from the second set of complex filter taps; and
   obtaining the imaginary output of each stage of the quadrature delay line by multiplying the signal at that stage of the quadrature delay line by an imaginary filter tap associated with that stage from the first set of complex filter taps.

5. The method of claim 2, further comprising:
   determining a gain compensation coefficient ($\alpha$) for the analog pipeline; and
   determining a phase compensation coefficient ($\beta$) for the analog pipeline;
   wherein at least one or both of the first set of complex filter taps and the second set of complex filter taps is based on the set of equalizer taps, the gain compensation coefficient, and the phase compensation coefficient.

6. The method of claim 5, further comprising:
   receiving a measurement from a receiver;
   wherein the determining at least one or both of the gain compensation coefficient ($\alpha$) and the phase compensation coefficient ($\beta$) is based on the received measurement.

7. The method of claim 5, wherein the first set of complex filter taps is defined by:

$$w_r(n) = (1+\alpha)h_r(n), \text{ and}$$

$$w_i(n) = h_i(n) - \beta h_r(n),$$

where $w_r$ is a real component of the first set of complex filter taps, $w_i$ is an imaginary component of the first set of complex filter taps, n is a delay line stage of the complex filter, $\alpha$ is the gain compensation coefficient, $\beta$ is the phase compensation coefficient, $h_r$ is a real component of the set of equalizer taps, and $h_i$ is an imaginary component of the set of equalizer taps.

8. The method of claim 5, wherein the second set of complex filter taps is defined by:

$$v_r(n) = h_r(n) + \beta h_i(n), \text{ and}$$

$$v_i(n) = (1+\alpha)h_i(n),$$

where $v_r$ is a real component of the second set of complex filter taps, $v_i$ is an imaginary component of the second set of complex filter taps, n is a delay line stage of the complex filter, $\alpha$ is the gain compensation coefficient, $\beta$ is the phase compensation coefficient, $h_r$ is a real component of the set of equalizer taps, and $h_i$ is an imaginary component of the set of equalizer taps.

9. The method of claim 2, wherein processing the signal further comprises:
   determining a skew between the in-phase and quadrature components of the signal on the analog pipeline; and
   adjusting a center tap position for at least one of the delay lines based on the determined skew.

10. A modem configured to compensate for impairments of a wireless device, comprising:
    an analog pipeline;
    an estimation module configured to determine a set of equalizer taps for the analog pipeline, and to determine a first set of complex filter taps and a second set of complex filter taps by modifying the set of equalizer taps according to an estimated imbalance of the analog pipeline associated with the analog pipeline of the modem;
    a complex filter comprising a multi-stage in-phase delay line and a multi-stage quadrature delay line, the complex filter configured to process a signal associated with the analog pipeline according to the first set of complex filter taps and the second set of complex filter taps, the complex filter configured to perform a combined imbalance compensation and equalization of the signal, wherein the complex filter comprises a first complex half-filter associated with the first set of complex filter taps and a second complex half-filter associated with the second set of complex filter taps, and each complex half-filter is configured to process both an in-phase component of the signal and a quadrature component of the signal;

a first summer configured to sum a real output of each stage of the in-phase delay line with an imaginary output of each stage of the quadrature delay line to obtain an in-phase output of the complex filter; and a second summer configured to sum an imaginary output of each stage of the in-phase delay line with a real output of each stage of the quadrature delay line to obtain a quadrature output of the complex filter.

11. The modem of claim 10, wherein:

the in-phase delay line is configured to pass the in-phase component of the signal to be transmitted; and the quadrature delay line is configured to pass the quadrature component of the signal to be transmitted.

12. The modem of claim 11, further comprising:

a first multiplier configured to output the real output of each stage of the in-phase delay line by multiplying the signal at that stage of the in-phase delay line by a real filter tap associated with that stage from the first set of complex filter taps; and a second multiplier configured to output the imaginary output of each stage of the in-phase delay line of the complex filter by multiplying the signal at that stage by an imaginary filter tap associated with that stage from the second set of complex filter taps.

13. The modem of claim 11, further comprising:

a first multiplier configured to output the real output of each stage of the quadrature delay line by multiplying the signal at that stage of the quadrature delay line by a real filter tap associated with that stage from the second set of complex filter taps; and a second multiplier configured to output the imaginary output of each stage of the quadrature delay line by multiplying the signal at that stage of the quadrature delay line by an imaginary filter tap associated with that stage from the first set of complex filter taps.

14. The modem of claim 11, wherein at least one or both of the first set of complex filter taps and the second set of complex filter taps is based on the set of equalizer taps, a gain compensation coefficient ($\alpha$) for the analog pipeline, and a phase compensation coefficient ($\beta$) for the analog pipeline.

15. The modem of claim 14, wherein the first set of complex filter taps is defined by:

$w_r(n) = (1+\alpha)h_r(n)$, and $w_i(n) = h_i(n) - \beta h_r(n)$, where $w_r$ is a real component of the first set of complex filter taps, $w_i$ is an imaginary component of the first set of complex filter taps, n is a delay line stage of the complex filter, $\alpha$ is the gain compensation coefficient, $\beta$ is the phase compensation coefficient, $h_r$ is a real component of the set of equalizer taps, and $h_i$ is an imaginary component of the set of equalizer taps.

16. The modem of claim 14, wherein the second set of complex filter taps is defined by:

$v_r(n) = h_r(n) + \beta h_i(n)$, and $v_i(n) = (1+\alpha)h_i(n)$, where $v_r$ is a real component of the second set of complex filter taps, $v_i$ is an imaginary component of the second set of complex filter taps, n is a delay line stage of the complex filter, $\alpha$ is the gain compensation coefficient, $\beta$ is the phase compensation coefficient, $h_r$ is a real component of the set of equalizer taps, and $h_i$ is an imaginary component of the set of equalizer taps.

17. The modem of claim 11, wherein the estimation module is further configured to:

determine a skew between the in-phase and quadrature components of the signal on the analog pipeline; and adjust a center tap position for at least one of the delay lines based on the determined skew.

18. A non-transitory computer-readable medium storing instructions executable by a processor to:

determine a set of equalizer taps for an analog pipeline of a wireless device;

modify the set of equalizer taps according to an estimated imbalance of the analog pipeline of the wireless device to determine a first set of complex filter taps and a second set of complex filter taps;

process a signal associated with the analog pipeline with a complex filter according to the first set of complex filter taps and the second set of complex filter taps, wherein the complex filter comprises a multi-stage in-phase delay line and a multi-stage quadrature delay line, the processing comprising a combined imbalance compensation and equalization of the signal, wherein the complex filter comprises a first complex half-filter associated with the first set of complex filter taps and a second complex half-filter associated with the second set of complex filter taps, and each complex half-filter processes both an in-phase component of the signal and a quadrature component of the signal;

sum a real output of each stage of the in-phase delay line with an imaginary output of each stage of the quadrature delay line to obtain an in-phase output of the complex filter; and sum an imaginary output of each stage of the in-phase delay line with a real output of each stage of the quadrature delay line to obtain a quadrature output of the complex filter.

* * * * *